United States Patent [19]

Kolodny et al.

[11] 4,260,854
[45] Apr. 7, 1981

[54] RAPID SIMULTANEOUS MULTIPLE ACCESS INFORMATION STORAGE AND RETRIEVAL SYSTEM

[75] Inventors: Gerald M. Kolodny; Paul R. Hughes, both of Sudbury, Mass.

[73] Assignee: Sudbury Systems Incorporated, Sudbury, Mass.

[21] Appl. No.: 579,063

[22] Filed: May 20, 1975

[51] Int. Cl.³ .................................... H04M 11/10
[52] U.S. Cl. .............................. 179/6.09; 179/1 B; 360/18; 360/71; 364/514; 364/900; 370/77; 369/29
[58] Field of Search ............. 179/6 R, 6 C, 6 E, 2 A, 179/2 DP; 360/18-21

[56] References Cited

U.S. PATENT DOCUMENTS

| 3,277,246 | 10/1966 | Altonji | 360/18 |
| 3,286,033 | 11/1966 | Lenilson | 179/6 E |
| 3,296,371 | 1/1967 | Fox | 179/6 E |
| 3,647,485 | 3/1972 | Langendorf | 179/6 E |
| 3,706,858 | 12/1972 | Keitel | 179/6 E |
| 3,783,199 | 1/1974 | Nye et al. | 179/6 E |

FOREIGN PATENT DOCUMENTS 46-1784  1/1971  Japan .................. 179/6 E

*Primary Examiner*—Raymond F. Cardillo, Jr.
*Attorney, Agent, or Firm*—Edward J. Collins

[57] ABSTRACT

Rapid simultaneous multiple access information storage and retrieval system including multiple simultaneously available audio dictation inputs and multiple simultaneously available audio outputs, an array of magnetic recording and playback instruments, and a controller operating under computer command for multiplexing the interchange of audio signals between inputs and outputs on the one hand and the magnetic recorder storage means on the other and at the same time for generating control signals to and from the input and output terminals.

12 Claims, 22 Drawing Figures

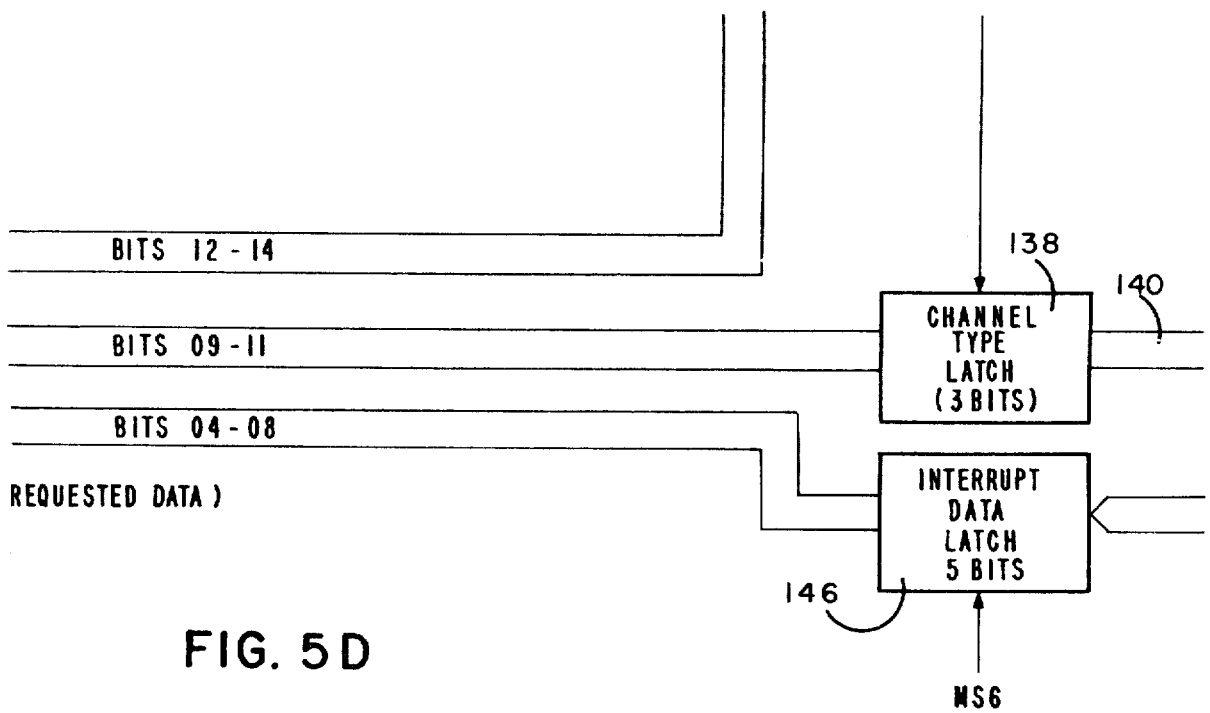

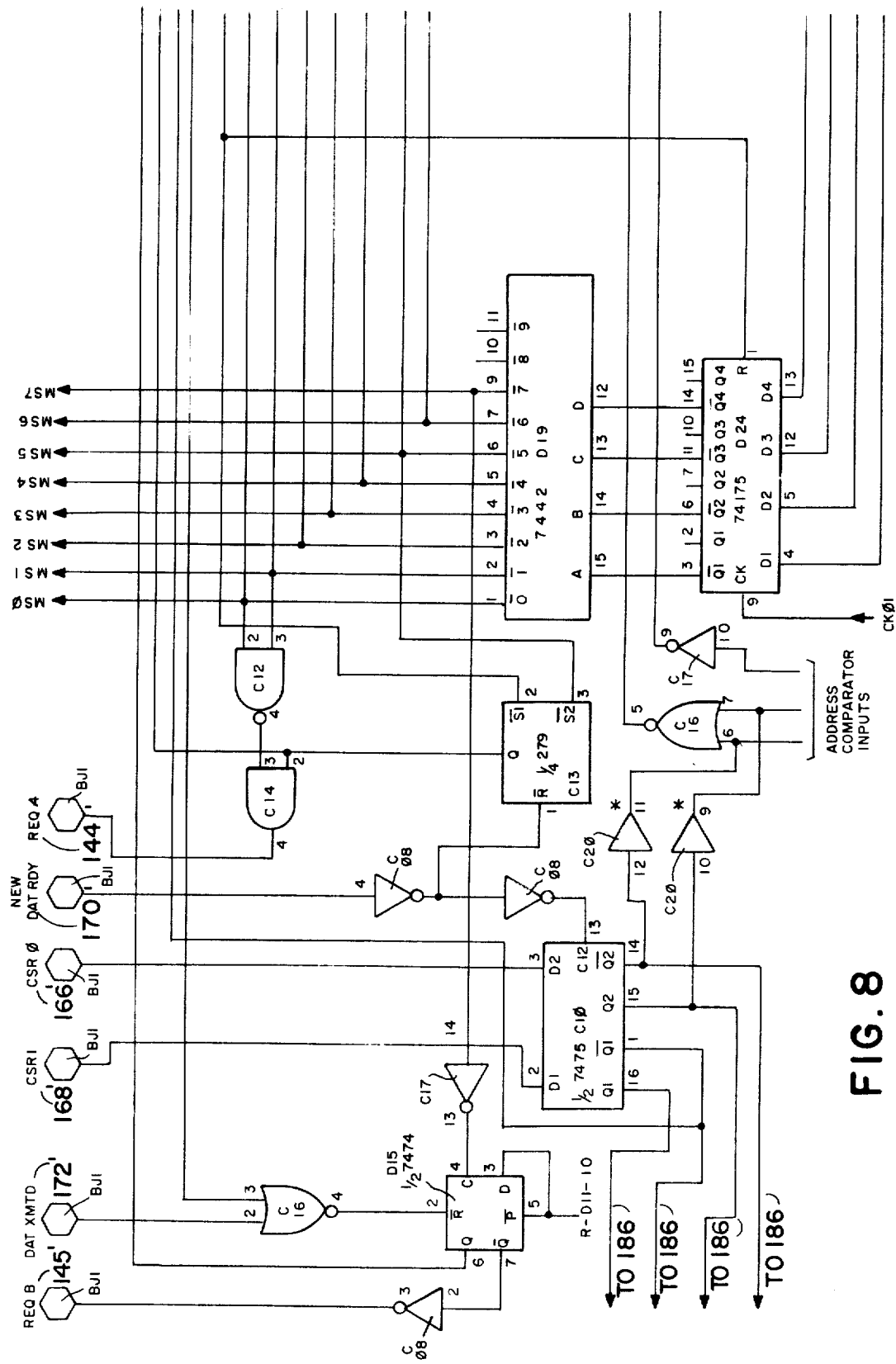

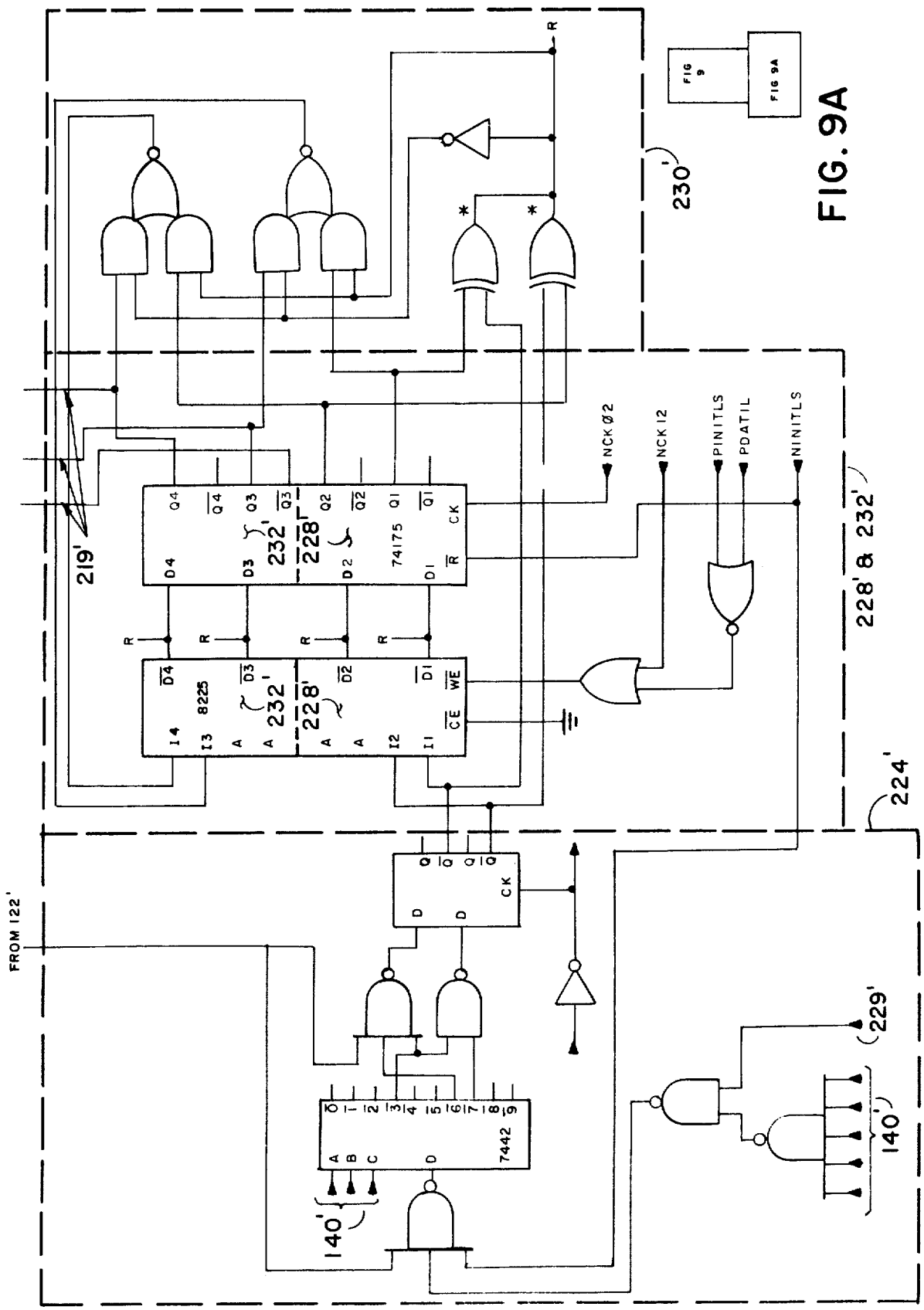

RAPID SIMULTANEOUS MULTIPLE ACCESS INFORMATION STORAGE AND RETRIEVAL SYSTEM

FIELD OF INVENTION

This invention relates to an information storage and retrieval system, and in particular to an information storage and retrieval system that at once provides multiple simultaneously available dictation inputs and multiple simultaneously available retrieval outputs, including local and remote access on demand by telephone.

BACKGROUND OF INVENTION

There are many situations in which it is necessary, useful, convenient, or cost-effective for some individuals to have rapid access to information available to others, particularly current information. For example, in a hospital setting a physician who refers a patient to a laboratory or specialist department for diagnosis or testing often has to wait an extended period of time for a report of the test results to reach him before he can procede with the indicated treatment for that patient. Studies in large general hospitals indicate that it takes about twenty-four hours for the average dictated radiological report to be distributed to the relevant patient's chart and even longer for the referring physician to obtain the requested results. The time is even greater in small hospitals. The delay between the interpretation of test results and access to that interpretation by those who most want and need it is a serious problem in the cost and effectiveness of health care delivery. Indeed, the delay often produced by the time it takes to assemble and transmit information is the cause of serious and costly problems in business, in industry, and elsewhere.

Heretofore, a variety of solutions have been proposed to meet this widespread problem. In the hospital setting, for example, it has been suggested that storing test results in computer memories would make such results rapidly available to those who wanted them through cathode ray tube readout terminals in several hospital locations. But this is a relatively costly solution and as a practical result the number of available terminals would be limited. Further, access to report results and other information would still presumably be available only to those actually in the hospitals and only when they are in the hospitals and even then only in those limited locations with cathode ray tube terminals. In addition, studies have shown that such systems are often cumbersome and time consuming to use since reporting physicians must abandon their customary dictation procedures and learn to communicate with the computer on its terms. A radiologist, for example, much prefers to watch the x-ray film he is interpreting than to pay heed to the computer's demands on his attention.

The prior art is best revealed to U.S. Pat. No. 3,286,033 which teaches as a suitable means for the storage and subsequent direct and rapid access to relevant stored information the use of a single magnetic drum with a plurality of recording areas, each of which is accessible by remotely controllable playback means that can produce a playback over telephone lines. However, useful as this approach is, it is not at all applicable to the typical real situation in which many individuals simultaneously wish to make information rapidly available to others by the use of the same storage system, often at the very same time that still many others want simultaneously to have access to various portions of that stored information. Further, in this prior art system, recording channels are preassigned so that when an assigned area is filled with stored information, the individual who has been assigned the use of that area must remove what he has stored previously if he is to store yet additional information. Further, magnetic drums typically contain a relatively small number of available storage areas, so that the system is limited in its storage capacity.

SUMMARY OF INVENTION

It is therefore an object of the present invention to provide rapid access to information dictated into some storage means for the use of others.

It is also an object of this invention to provide easy dictation or input access to a storage means without requiring cumbersome or new procedures, i.e. the access itself is transparent, which access in addition is available to a large number of individuals simultaneously.

It is a further object of this invention to provide input access flexibility to meet shifting needs and use patterns so that storage capacity will always be available to a user.

It is yet another object of this invention to provide easy, reliable, convenient, and inexpensive access to such information by telephone and otherwise, and to provide such access to a large number of individuals simultaneously.

It is also an object of this invention to allow at once the simultaneous storage and the simultaneous retrieval of information by a large number of persons.

It is a further object of this invention to provide a system for the transcription (e.g., by a typist) of the contents of stored information without disturbing that stored information, i.e. while continuing to make it available to its normal telephone users.

It is also an object of this invention to allow immediate access to the most current stored information without the necessity of reviewing beforehand all previously stored information on a relevant topic or patient.

It is yet another object of the present invention to allow the various uses of the system to be monitored for statistical, maintenance, and other purposes.

It is a further object of this invention to provide magnetic recording means that can be controlled locally or from remote locations.

It is also an object of this invention to provide playback means that can be controlled locally or from remote locations.

It is also an object of this invention to provide relatively low cost efficient information storage and retrieval means through the use of multiplexing techniques such that a large number of users may simultaneously have access to the system and its functions.

It is still another object of this invention to provide safety or backup means for an information storage and retrieval system should some of its memory functions be temporarily or permanently disabled.

It is a further object of this invention to provide simultaneously audio multiplexing of a communications channel-tape recorder interconnection and the control of the tape recorder's motions and functions from a terminal of that communications channel.

It is yet another object of this invention to provide a controller means directed to adapting a computer to guide the simultaneous audio multiplexing of a communications channel-tape recorder interconnection and the control of the tape recorder's motions and functions from a terminal of that communications channel.

It is also an object of this invention to provide a rapid simultaneous multiple access information storage and retrieval system by the use of a plurality of short message period magnetic recording devices.

It is a further object of this invention to provide the above benefits for medical reporting in a hospital or similar setting.

The invention therefore features a rapid simultaneous multiple input or output access information storage and retrieval system.

DISCLOSURE OF PREFERRED EMBODIMENT

Other objects, features, and advantages will occur from the following description of a preferred embodiment and the accompanying drawings in which:

FIG. 1 shows an axonometric view of the cabinet housing for the rapid simultaneous multiple access information storage and retrieval system of the present invention. It also depicts the various input and output devices that may be connected to the system, namely teletype units, dictation units, transcription units, and telephones, either within or remote from the building where the system is located.

Figure 2:
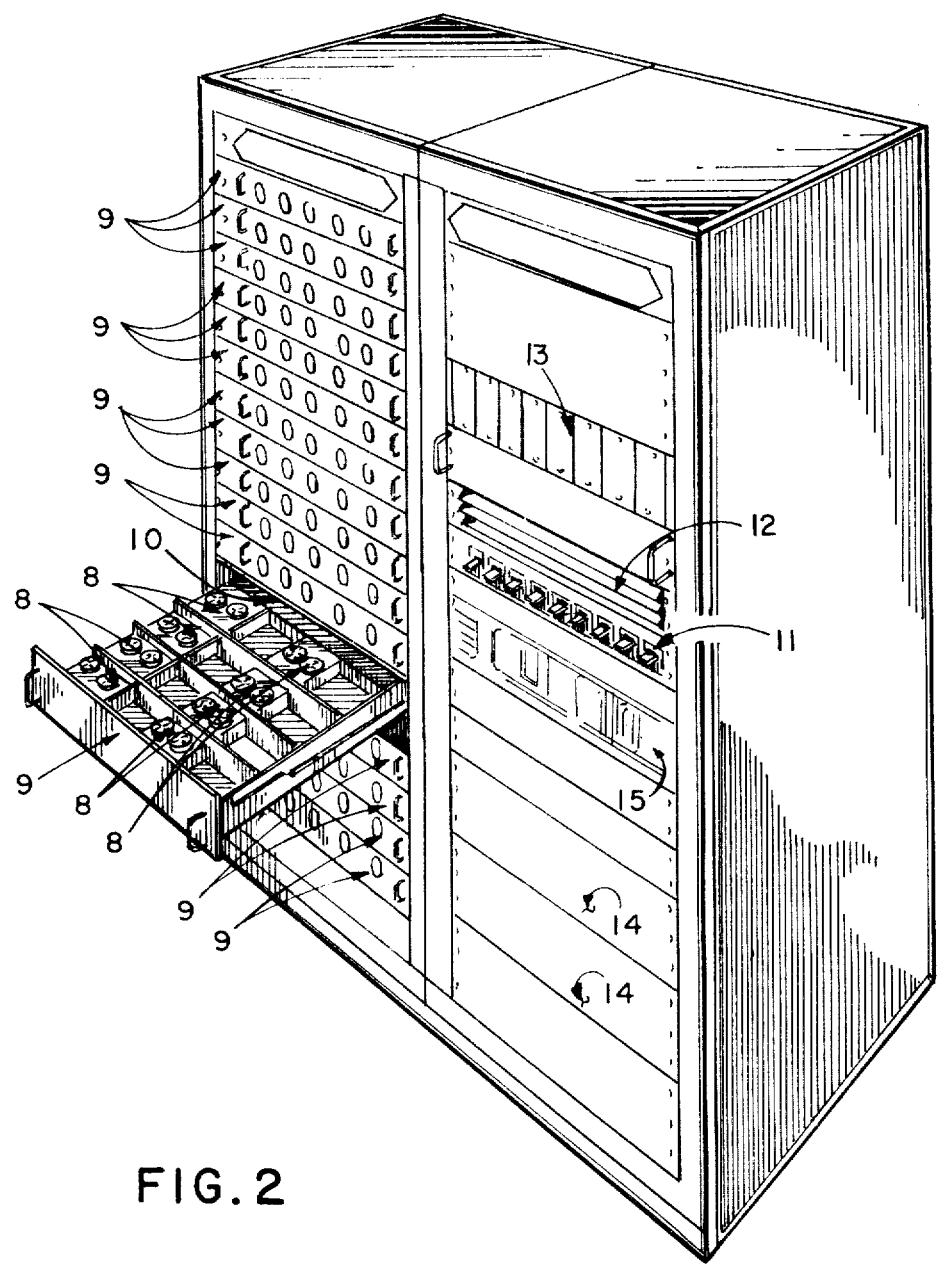
FIG. 2 is an enlarged axonometric view of the cabinet housing of FIG. 1, showing also eight tape recorders housed in a single drawer, a number of such drawers, and the location of the computer, the controller, the program loading digital cassette, the input/output modules and interface circuitry, and the system's power supply.

FIGS. 5A-D, 6A-B, and 7A-B are separate connecting sections of a block diagram of the controller of FIG. 2, showing also the interconnections between the system's computer, computer interface, tape recorders, input/output units, teletype, program loading cassette unit, and the controller.

Figure 8A:
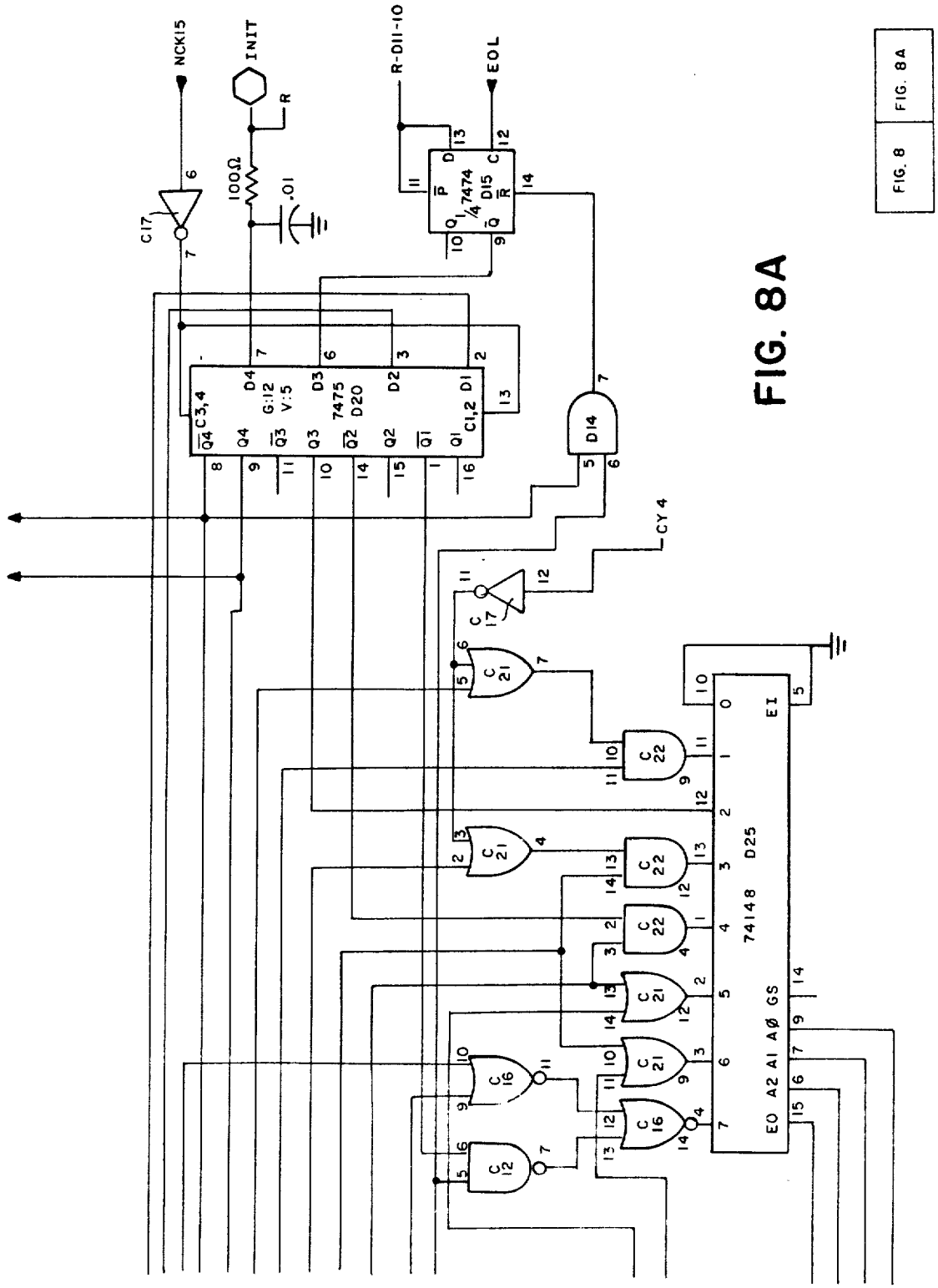

FIG. 8 and 8A are schematic drawings of the major state generator circuitry of the controller of FIGS. 5, 6, and 7.

Figure 9:
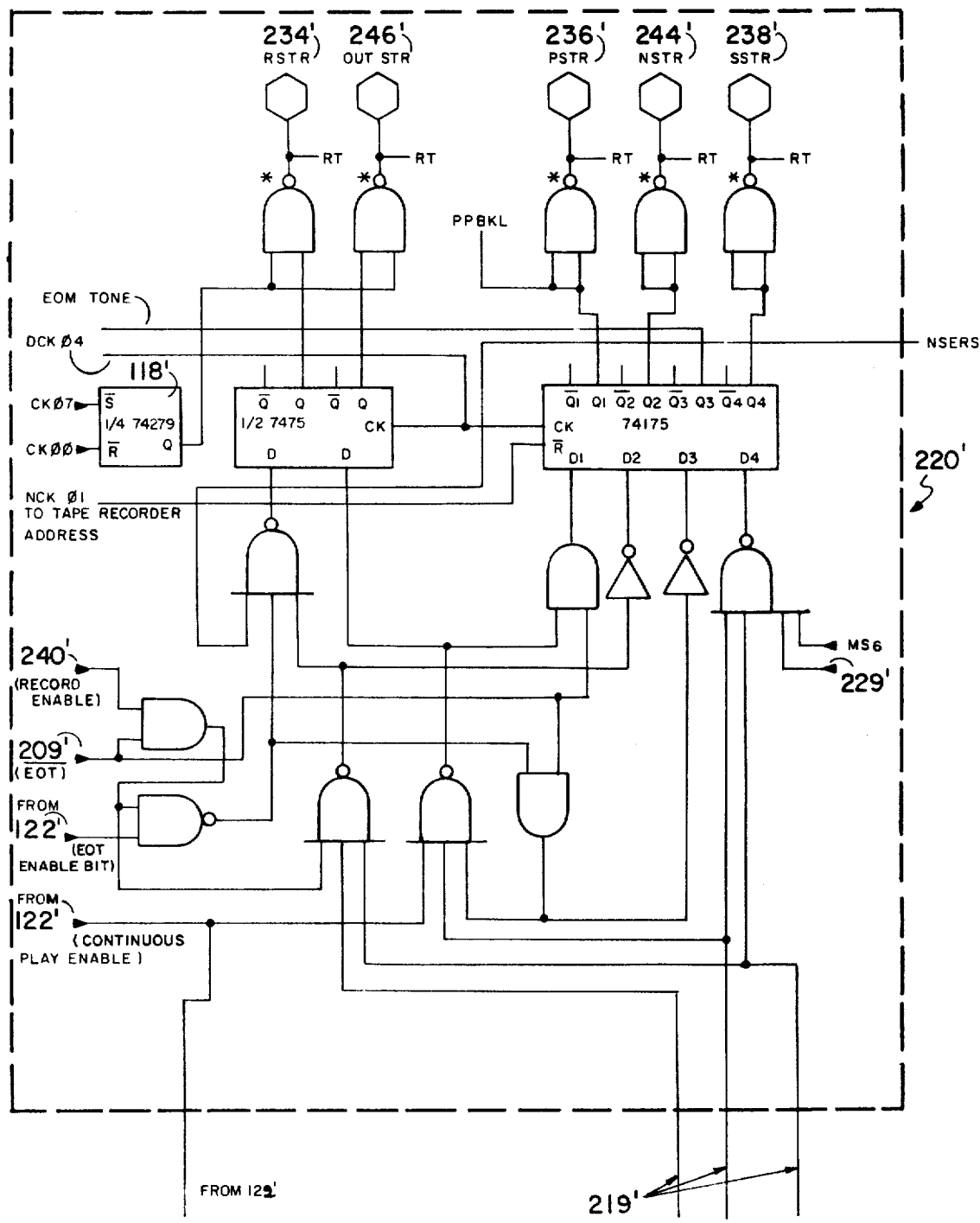

FIGS. 9 and 9A are schematic drawings of the circuitry of the multiplexer and tape motion control logic of the controller of FIGS. 5, 6, and 7.

Figure 10:
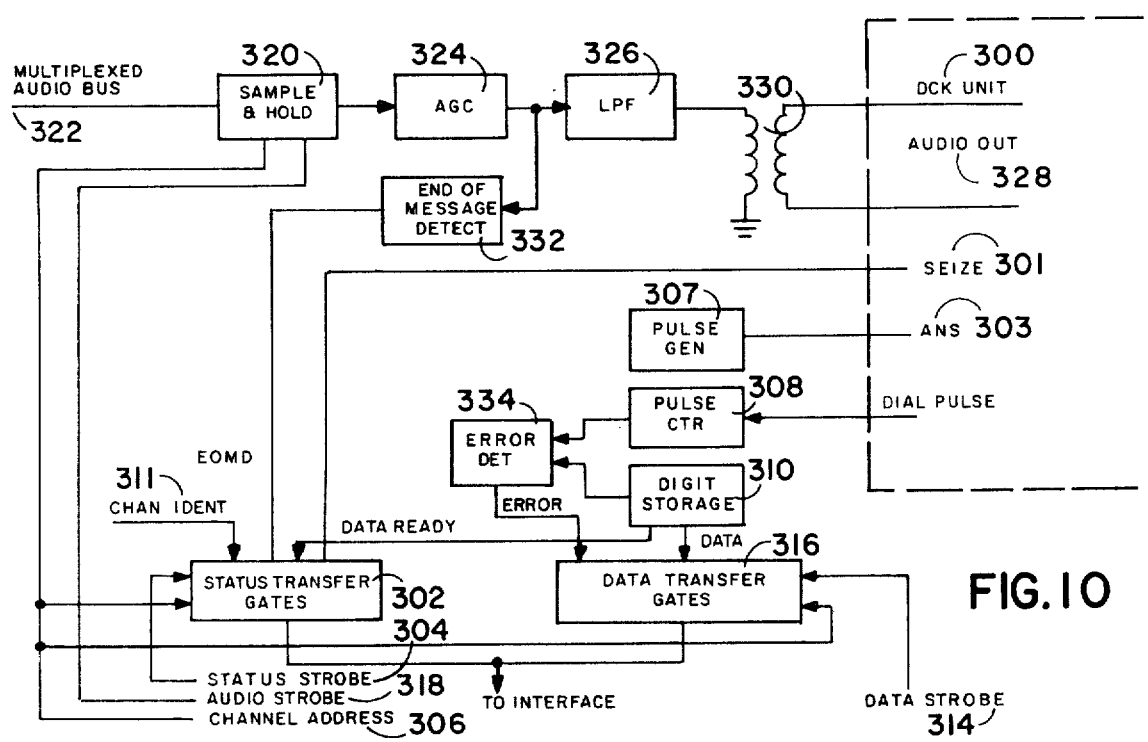

FIG. 10 is a block diagram of the system's internal telephone access port, i.e. of the circuitry necessary to interconnect a user seeking access to the system's storage means directly through a telephone private branch exchange.

Figure 11:
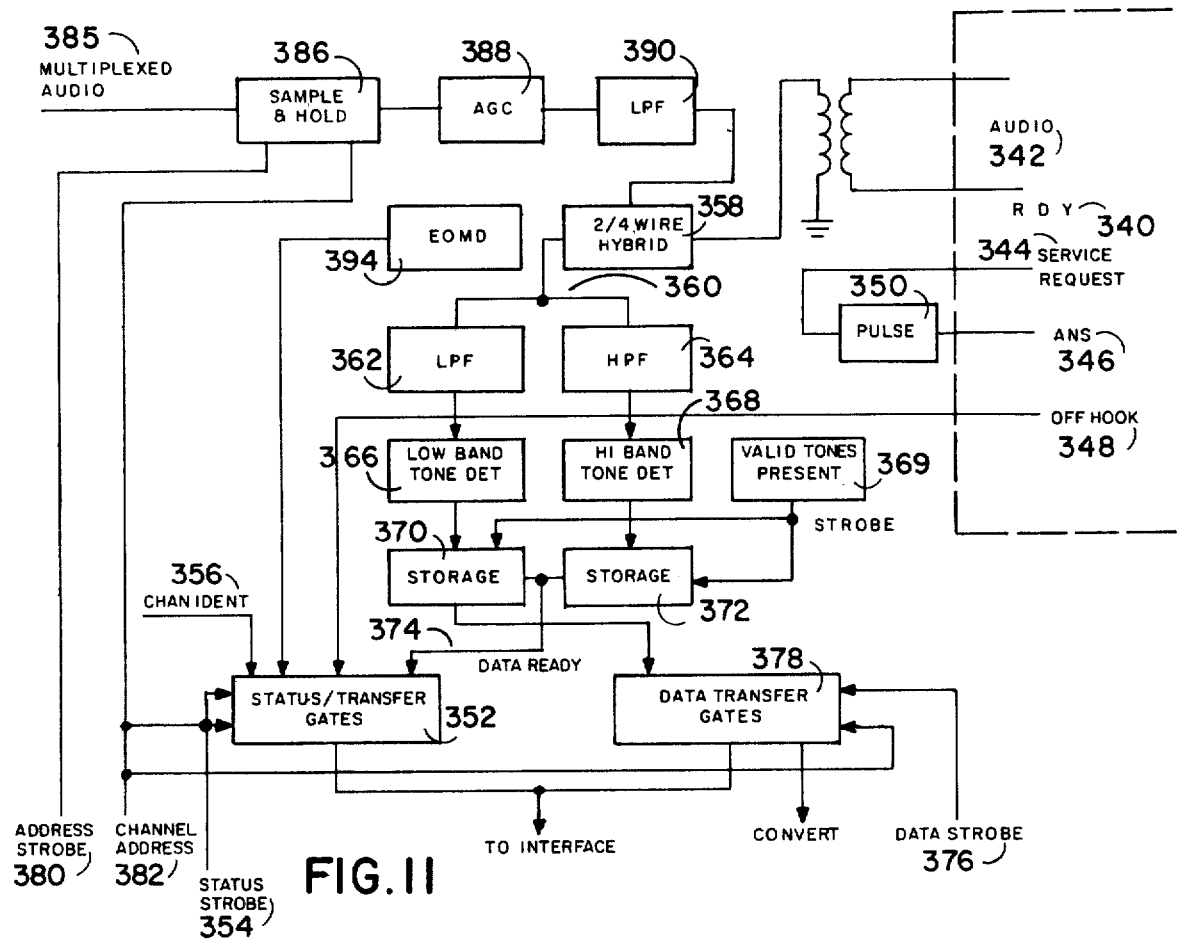

FIG. 11 is a block diagram of the system's external telephone access port, that is of the circuitry necessary to interconnect a user seeking access to the system's storage means through a telephone company central office.

Figure 12:
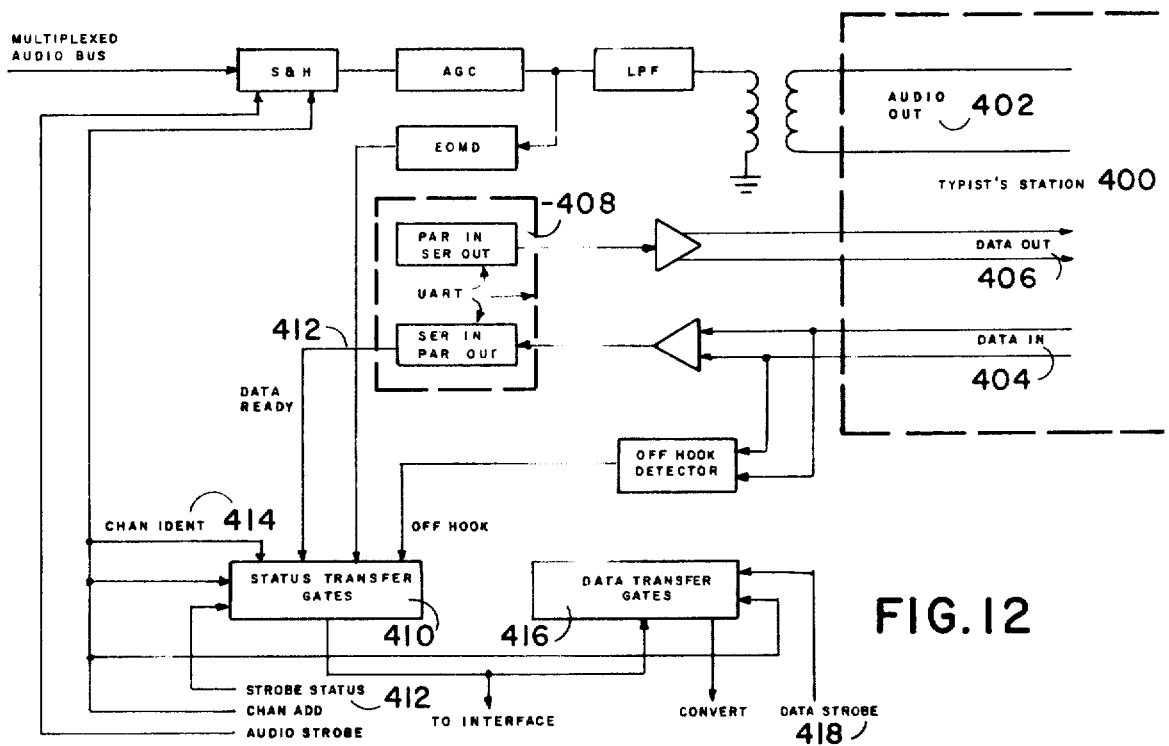

FIG. 12 is a block diagram of hard-wired transcribing unit access to the system, i.e. of the circuitry necessary to interconnect a transcribing secretary's transcription unit directly to the system's storage means.

Figure 13:
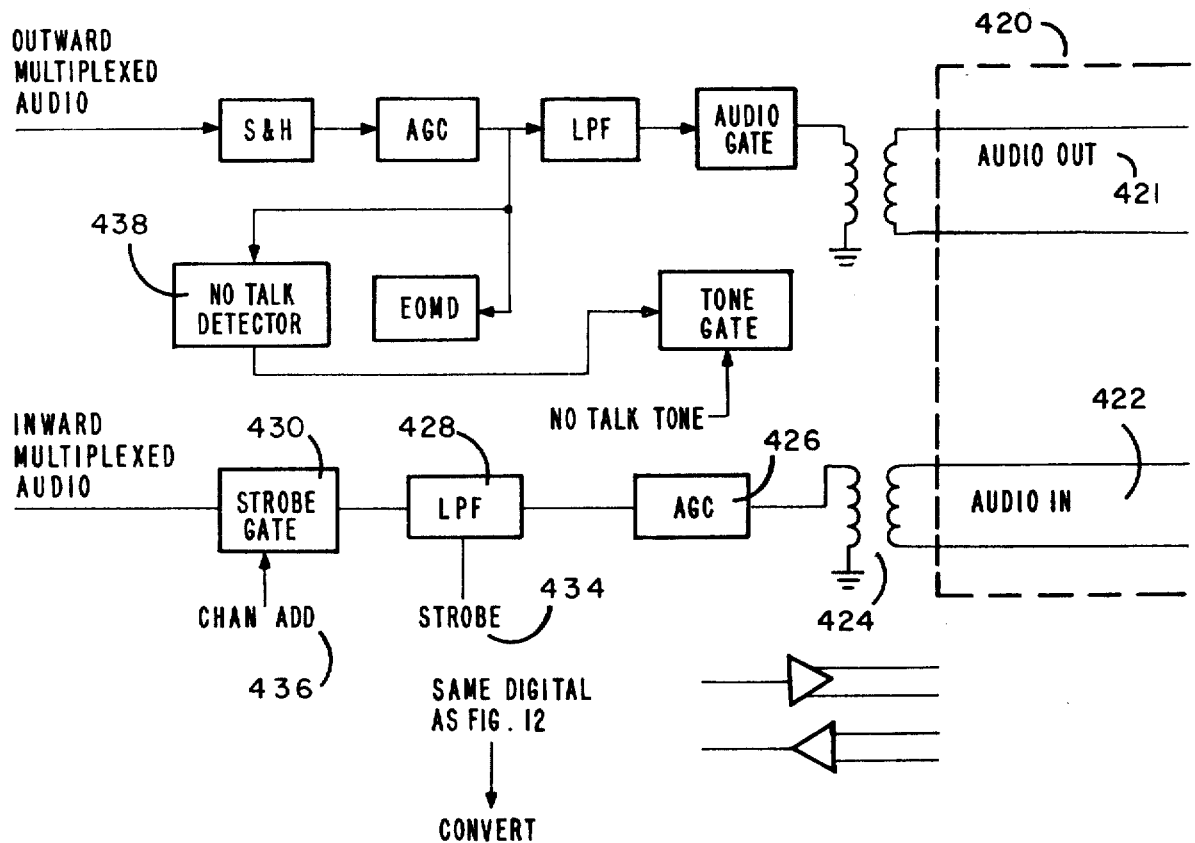

FIG. 13 is a block diagram of the dictating unit access to the system, i.e. of the control and bi-directional audio circuitry necessary to interconnect a user's dictating unit directly to the system's storage means.

Figure 14:
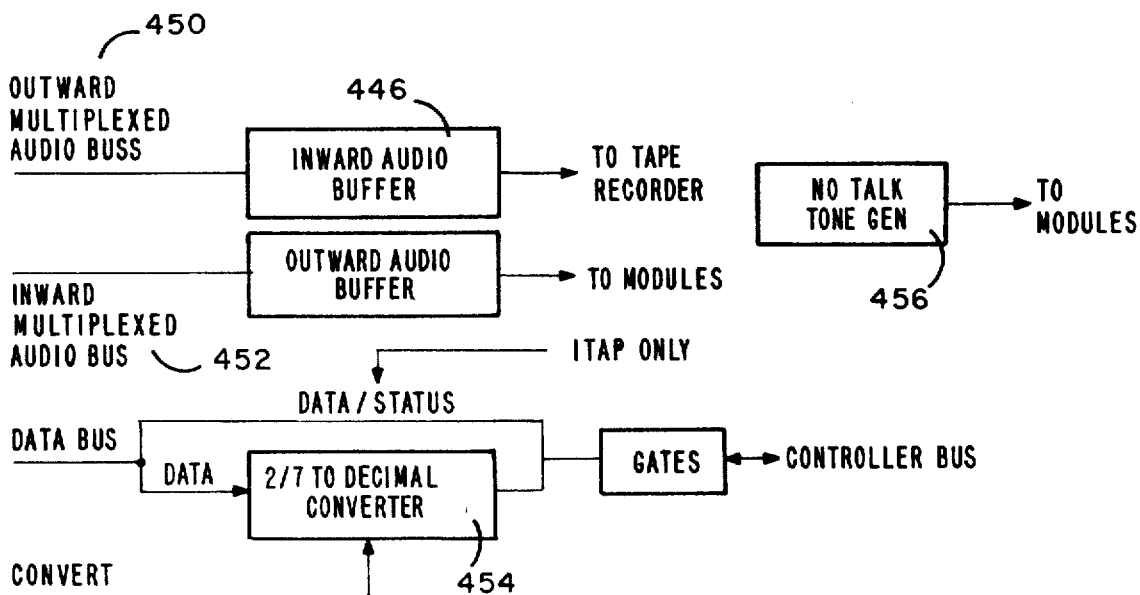

FIG. 14 is a block diagram of the interface circuitry between the system's access terminals and the controller.

FIG. 15 shows the interrelationship between FIGS. 5, 6, and 7.

In the interests of clarity, it will be assumed that the rapid simultaneous multiple access information storage and retrieval system of the present invention is dedicated to the storage and rapid retrieval of radiological information in a hospital-centered setting. Typically, several radiologists will simultaneously be dictating the results of their analyses of patients' x-rays into the system's storage means and at the same time several of the physicians who have originally referred patient's for radiological analyses will simultaneously be seeking access in the system's storage means to those reports. The invention is not, of course, limited to this embodiment. It might, as well, be used for the rapid communication of other types of medical information and indeed for the rapid communication of any kind of information.

Figure 1:
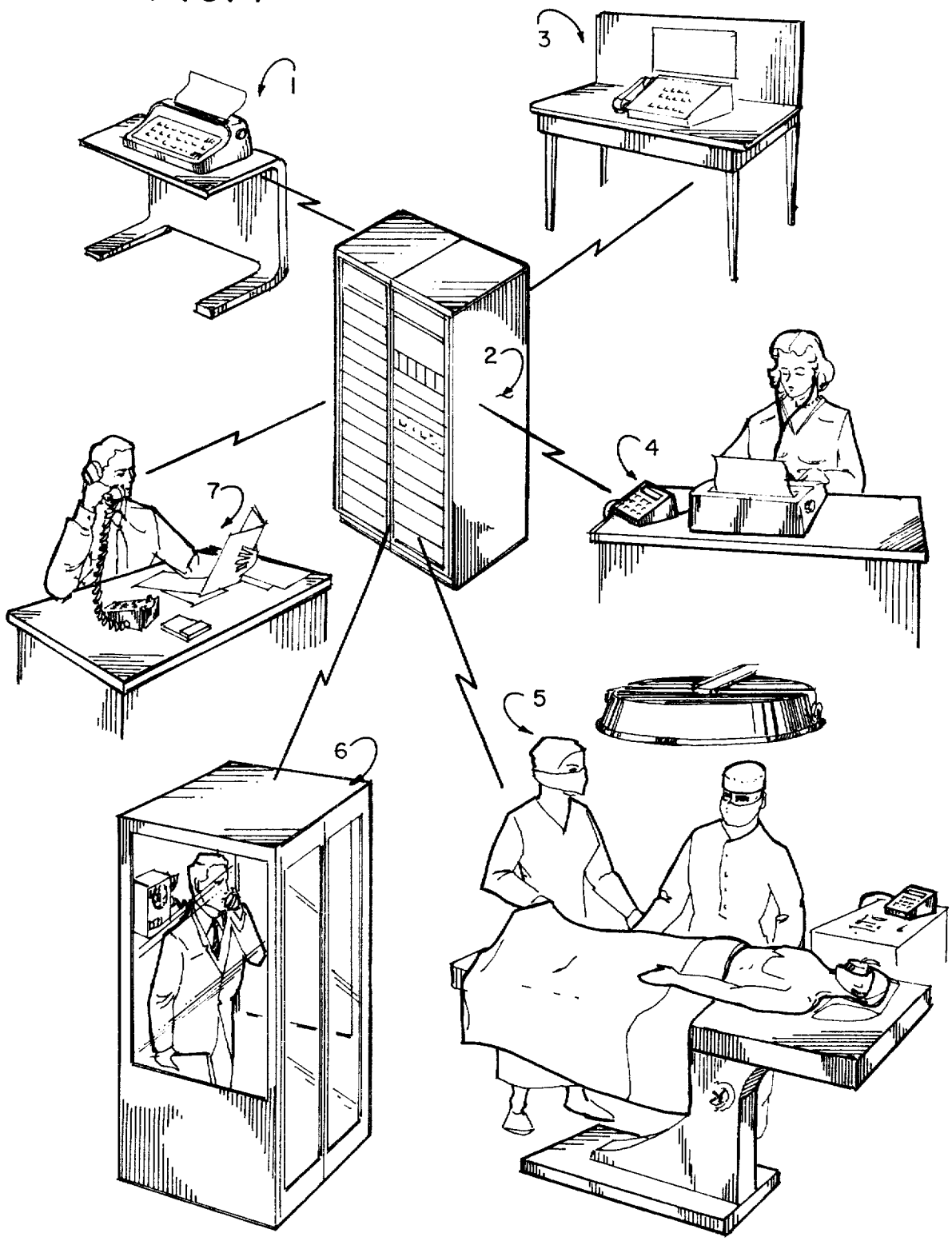

Refer now to FIG. 1. In the usual situation, a patient for whom a radiological examination has been requested will have an identification code entered into the system's computer requisition file memory through a peripheral teletype unit 1. Typically, the patient's identification code will be his name or a number assigned to him by the hospital. The system's computer is itself stored in the system housing cabinet 2. When a radiologist is ready to interpret an x-ray film, he dictates his report, identifying it with both his and the patient's identification code, through a dictation unit 3 into the system's storage means. His report may also be entered through telephonic means. The system's storage means is also stored in the system housing cabinet 2. Several radiologists may dictate reports simultaneously. As soon as a radiologist's report has been dictated, access to it is available in a variety of ways. The radiologist and others may listen to it on the dictating unit 3. A secretary or others may listen to it on a hard-wired transcribing unit 4. Typically the secretary will be reducing the recorded report to typewritten form for permanent storage in the patient's chart. Referring physicians may have immediate access to radiologists' reports by telephone, either from within the hospital 5 or from locations remote from the hospital 6 and 7.

Refer now to FIG. 2. Each one of the radiologists' reports is stored on an individual tape recorder 8 having its own playback amplifier and control circuitry. (Like components have like numbers). Typically, eight such tape recorders 8 are contained in a single drawer 9. A recording amplifier, including a bias oscillator whose output can be connected by relay to any tape recorder 8, and eight-way multiplexing circuitry connected to the tape recorders 8 in a given drawer 9, is located at the rear 10 of each drawer 9. Again typically, sixteen such drawers 9, or 128 tape recorders, are contained in one section of the system housing cabinet 2. Other units containing sixteen drawers 9 each may easily be added to the system without additional changes in other parts of the system's circuitry, up to a maximum of 1024 tape recorders 8. Still additional tape recorders may also be added to the system with appropriate changes in the circuitry described here. A computer 11, controller 12, input/output modules and interface circuitry 13, the system's power supply 14, and a digital cassette device 15 for loading the computer's memory and for providing a backup means for retrieving stored information should the computer fail are also stored in the system housing cabinet 2.

Figure 3:
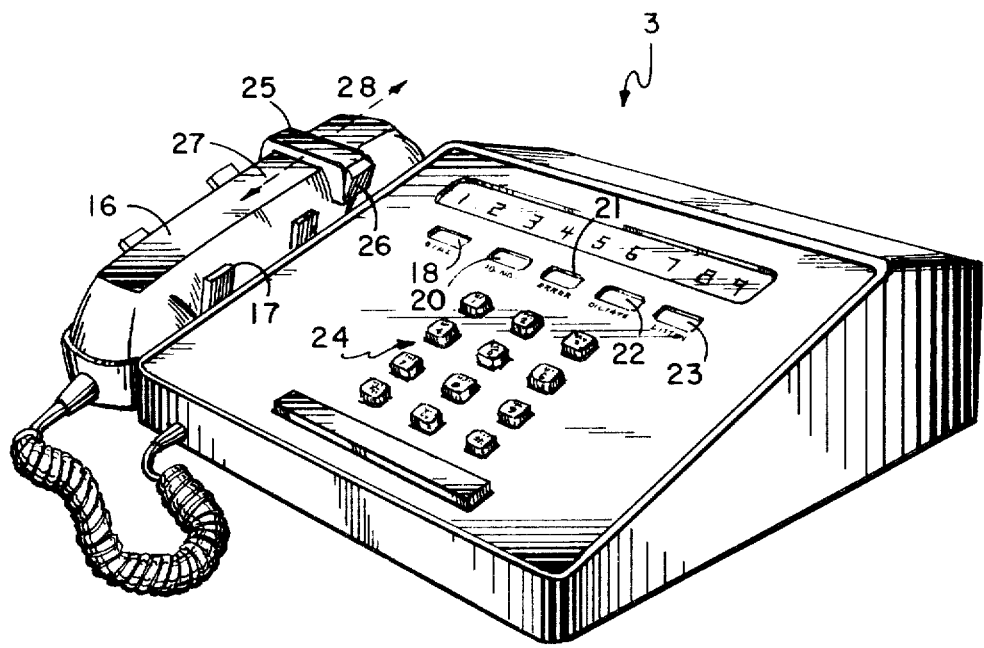
FIG. 3 is an enlarged axonometric view of one of the dictation units of FIG. 1, showing more particularly the control means on the dictation hand set, the keyboard, the alphanumeric electronic display, and the control function indicator lights.

Refer now to FIG. 3 which shows a detailed view of a radiologist's dictating unit 3. This is the only access device in the system which contains a two-way audio path, i.e. the dictating physician can store audio information in the system's storage means as well as listen to already stored audio information. In typical use, when the dictating radiologist removes the unit's hand set 16 from its cradle 17, the off-hook condition thereby generated will be indicated by an illuminated display signifying dial 18. The dictating radiologist then enters the identification code of the patient that he is reporting on by depressing the appropriate characters on the dictating unit's keyboard 24. That code appears in an alphanumeric display 19 for purposes of verification. He then presses the appropriate function key (in this case #), and the "ID No." light will come on, requesting him to enter his own identification code. If the patient's identification code has not been previously stored in the computer's requisition file memory as described above in discussing FIG. 1, the identification number light 20 will flash on and off indicating that the system is not yet ready to receive a report on that patient. If the patient's identification number has previously been stored in the computer's memory but is entered incorrectly, for example, if too few or too many letters or numbers are entered compared to the appropriate identification code, the error indicator 21 will light up. If the patient's identification code has been previously stored in the computer's requisition file memory and has also been correctly entered, the dictation light 22 will come on signifying to the radiologist that the system is ready to accept and store his report in its memory means. If the dictating physician or anyone else wishes to listen to a report already stored in memory, he removes the handset 16 from its cradle 17, dials the identification code of the patient whose reports he wishes to hear, and then depresses the appropriate function key (here the * key), thereby enabling the listen mode, which enablement is indicated by a light appearing in the listen space 23. When dictating a report, the radiologist controls the mechanism governing the tape recorder's motion and function by pressing the record button 26 on the hand set 16 to record, by moving the control switch 25 backwards 27 to rewind the tape, by moving the control switch 25 forward 28 to listen to what has been recorded, or by leaving the control switch 25 in its normal position to stop the tape's motion. The same applies to the listen mode except that record commands are ignored (construed as "listen").

Figure 4:
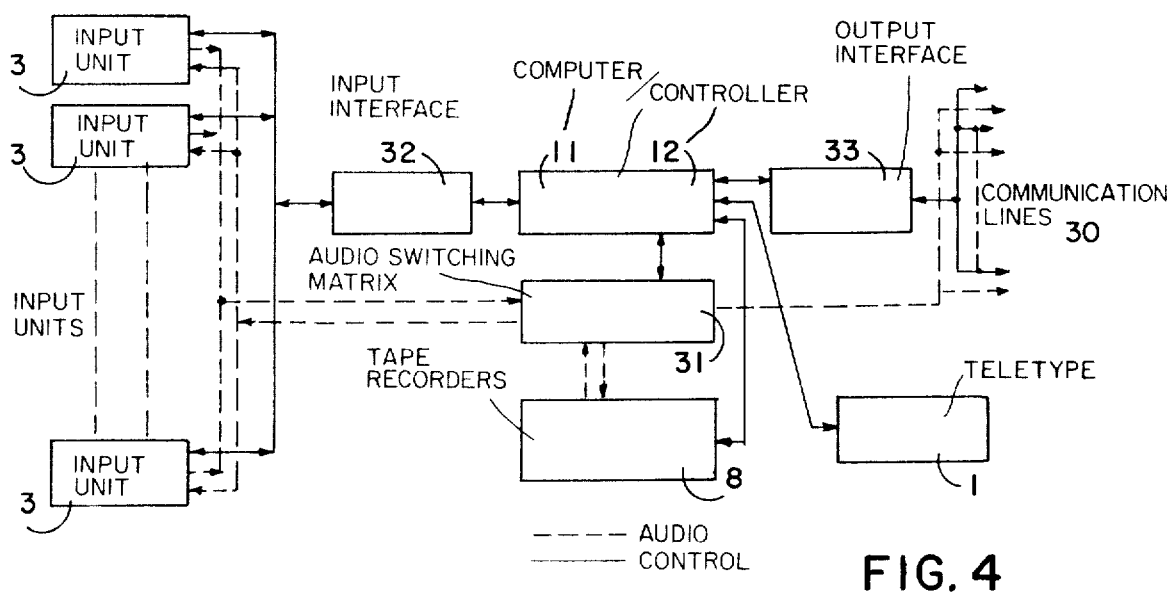
FIG. 4 is a block diagram showing the various functional components of the rapid simultaneous multiple access information storage and retrieval system.
Figure 5A:
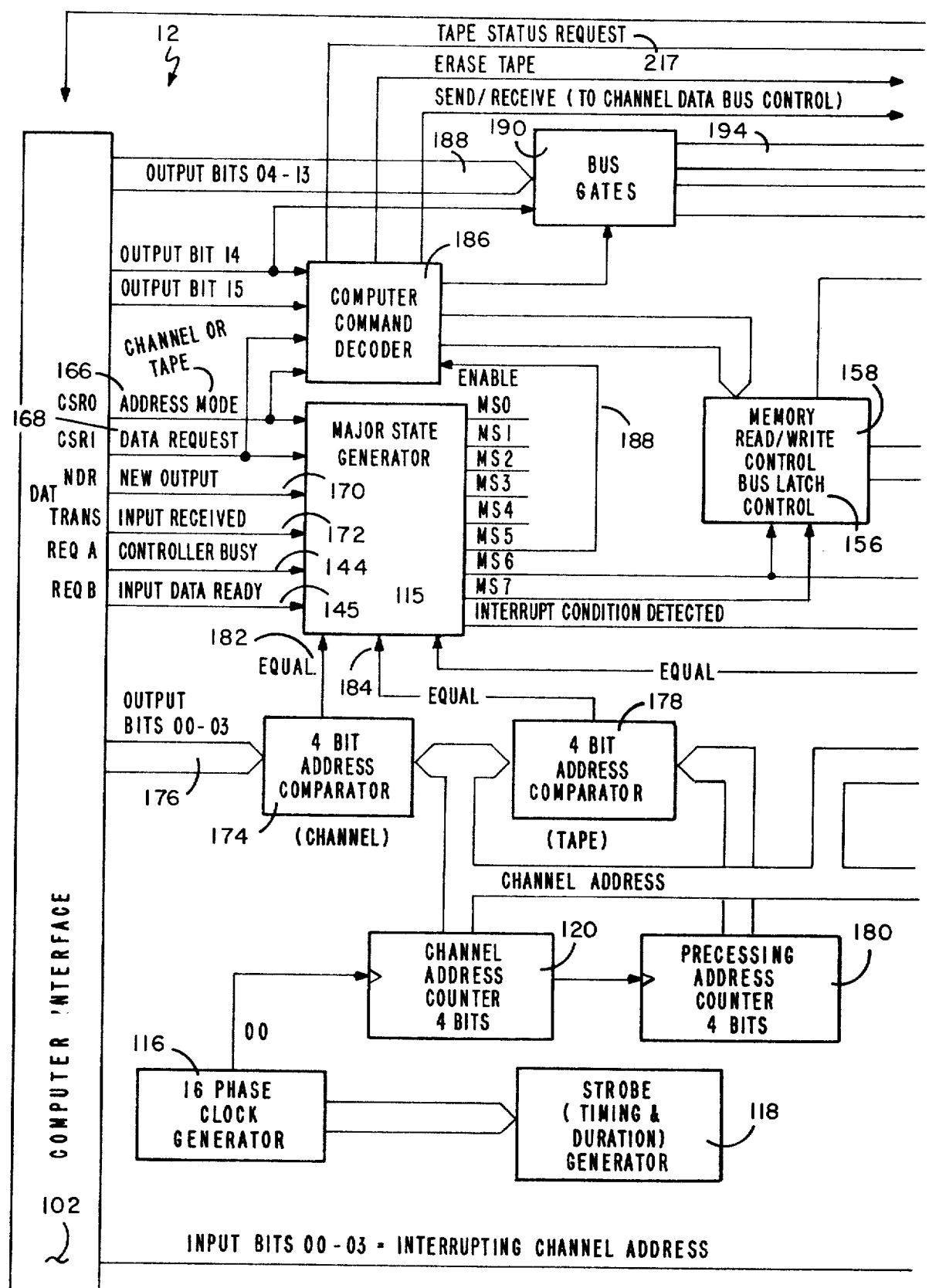
Figure 5B:
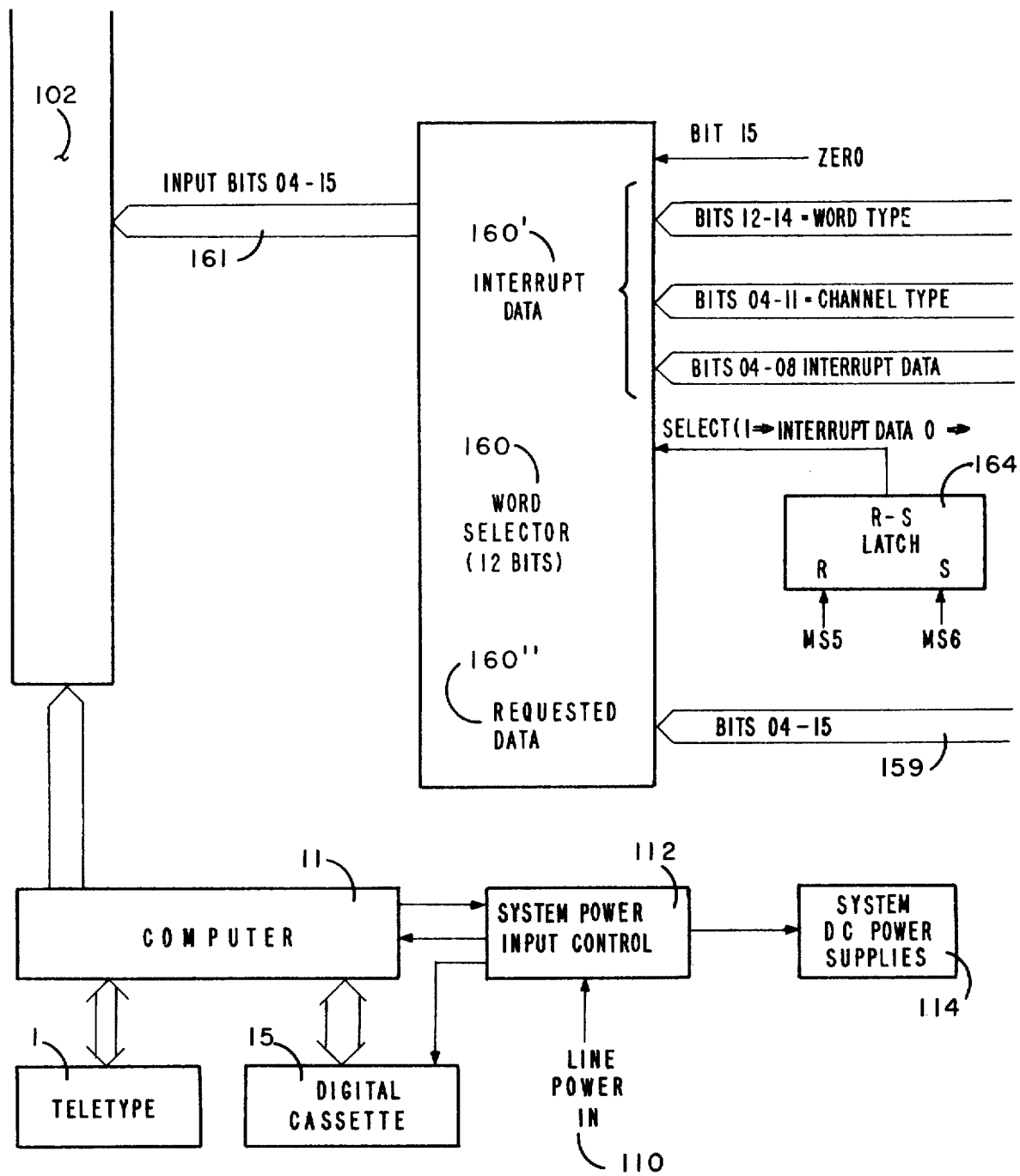
Figure 5C:
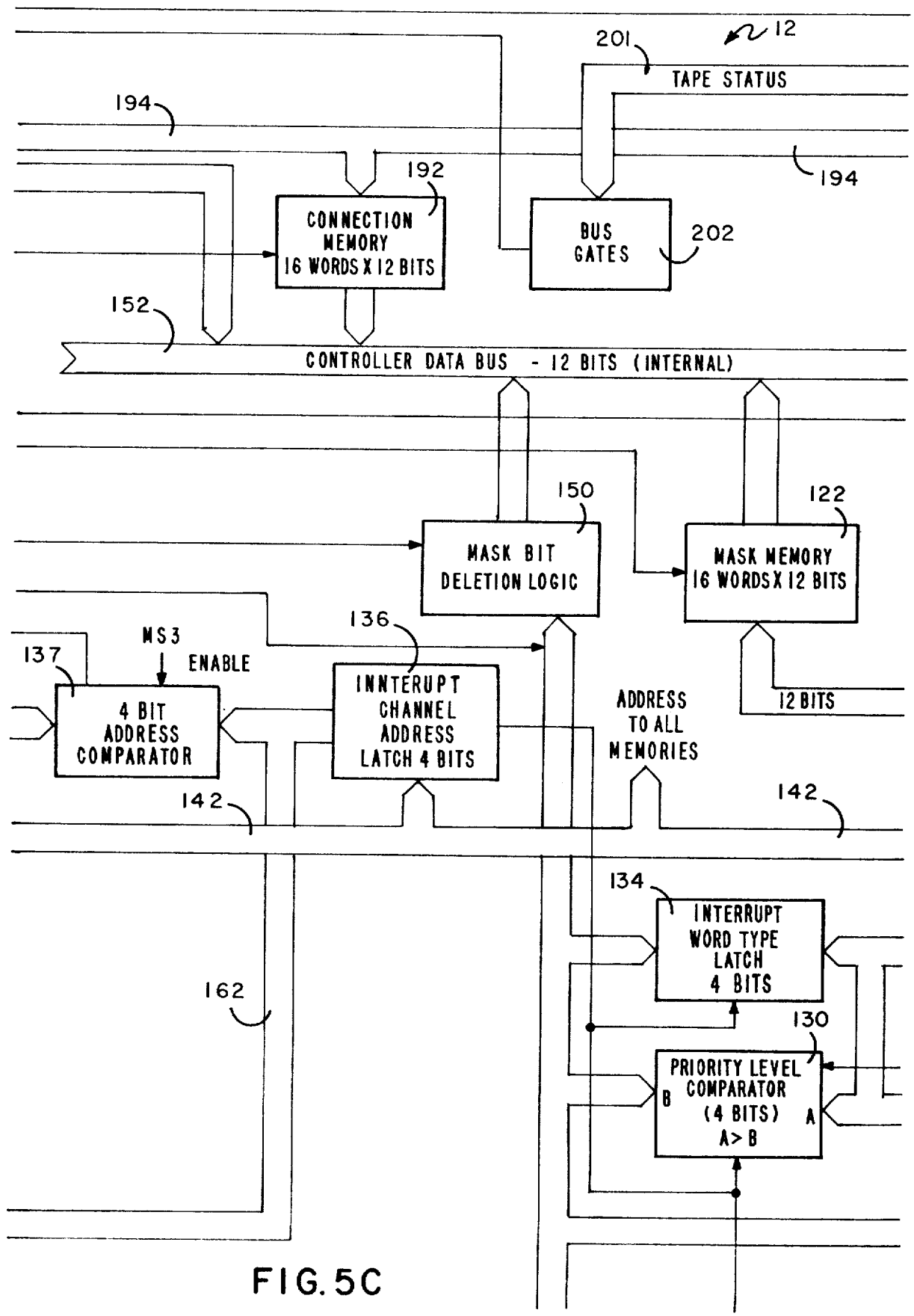
Figure 6A:
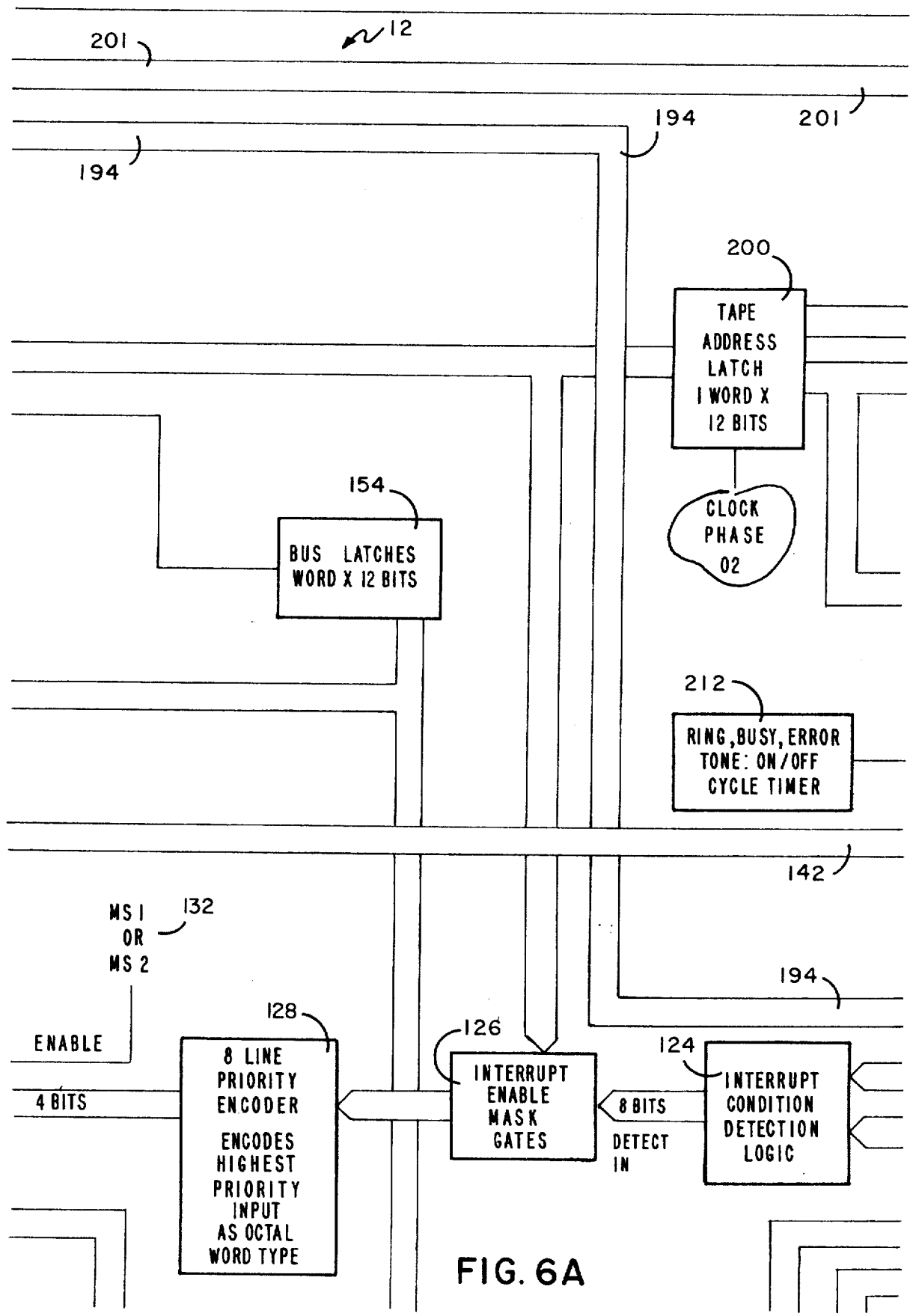
Figure 6B:
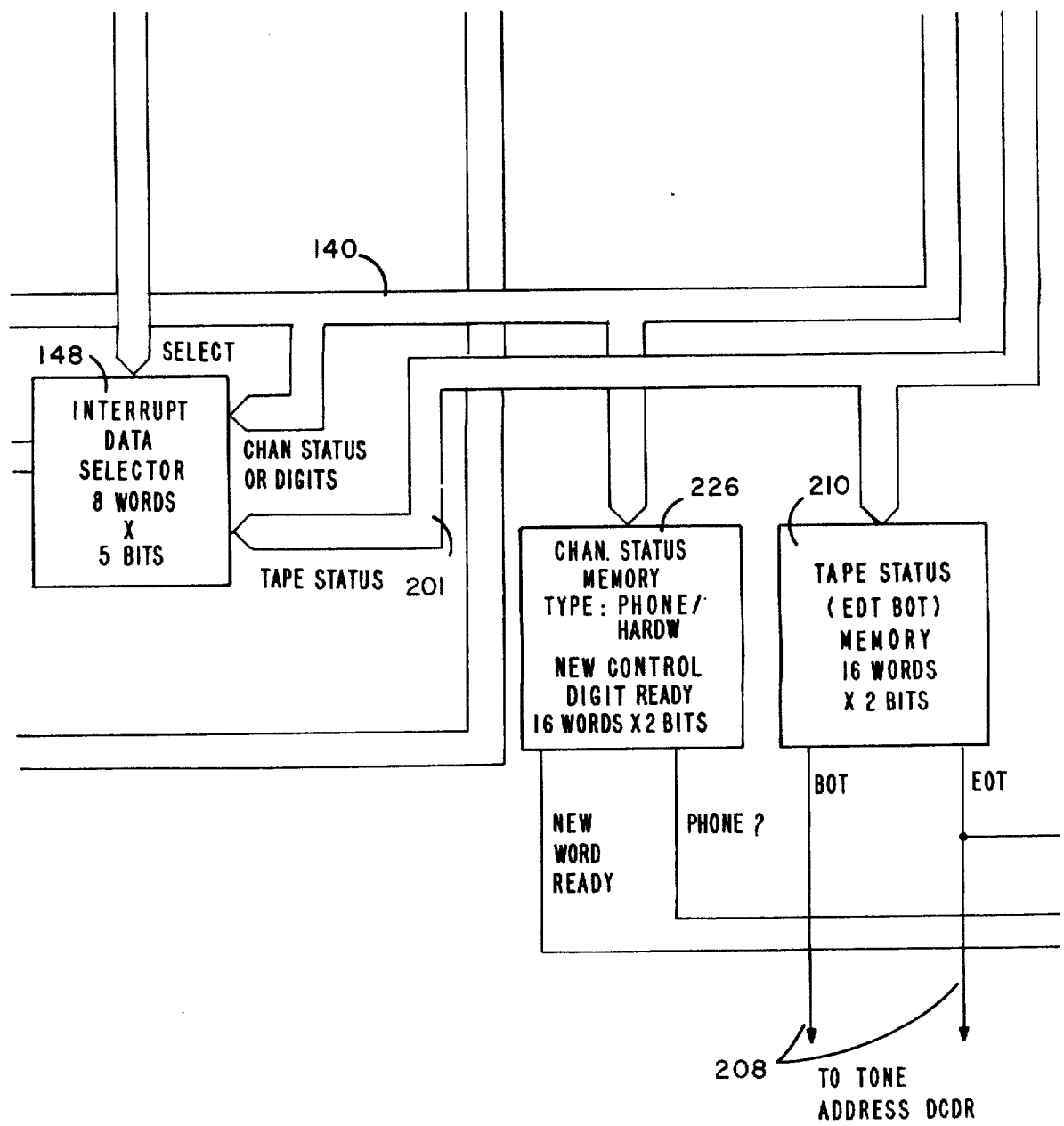
Figure 7A:
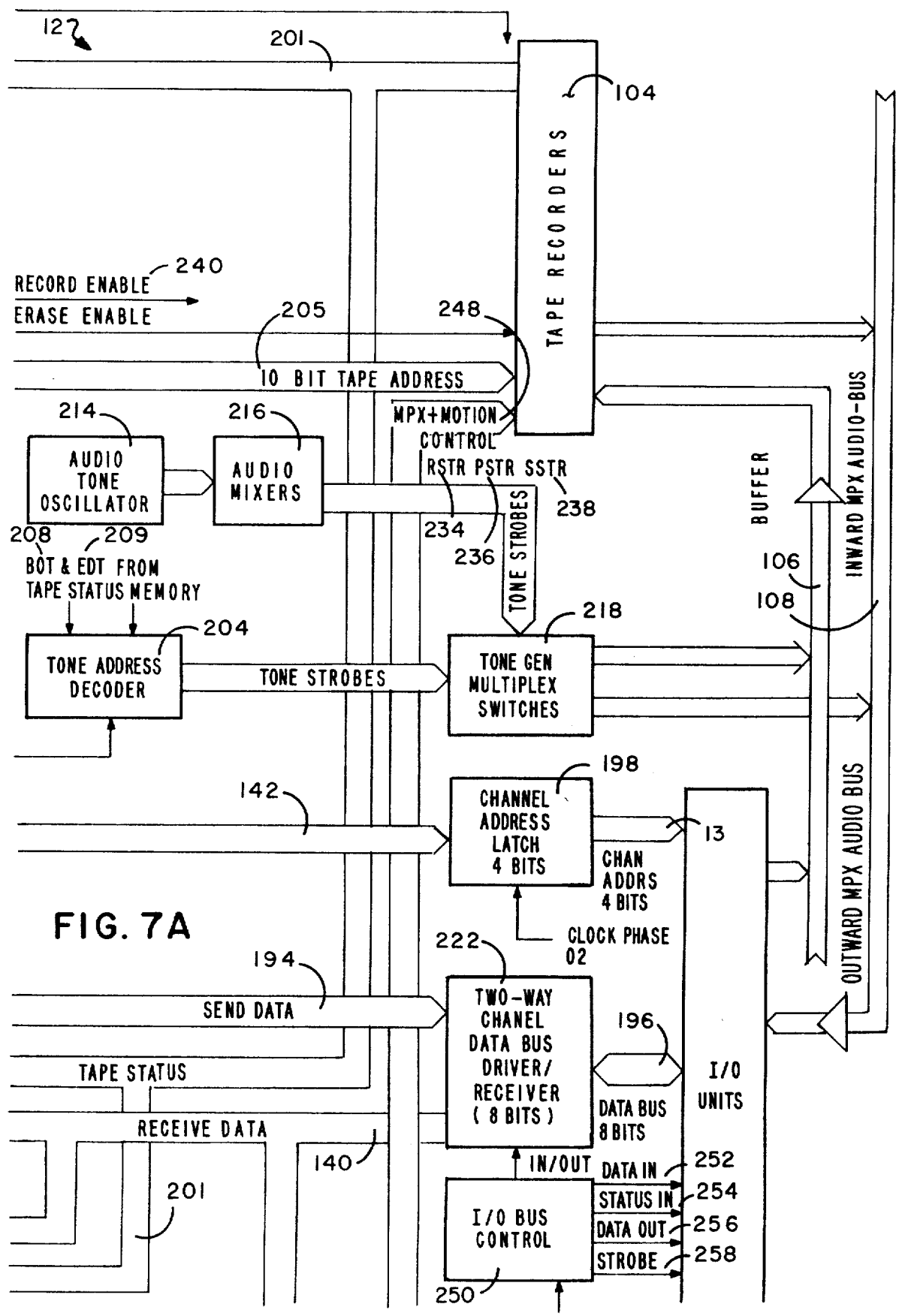
Figure 7B:
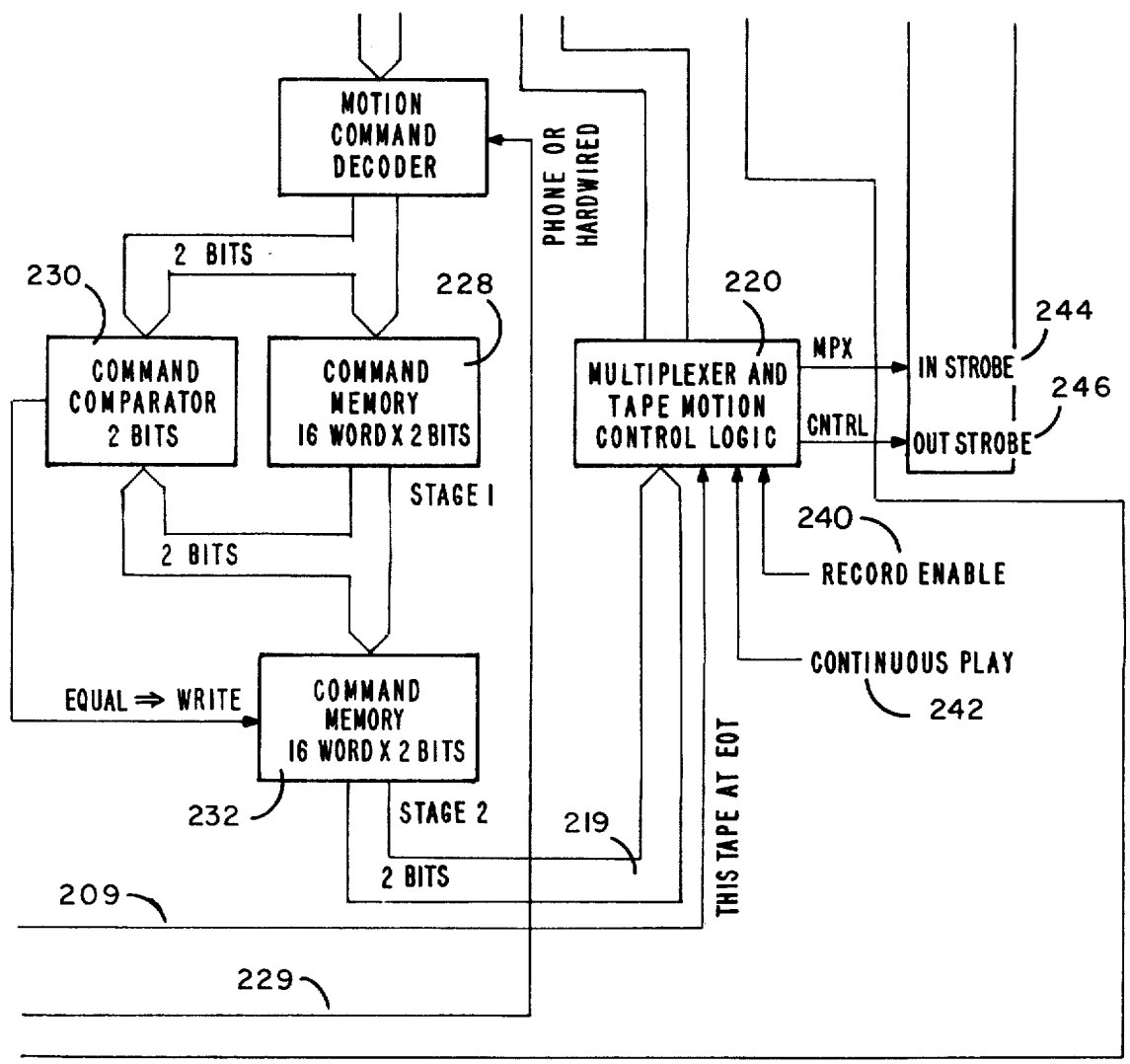

Refer now to FIG. 4 which schematically illustrated in block diagram form the various functions of the system described in the present application and their interrelations. The input units 3 are typically the dictating units used by the radiologist. They may also be telephones. The communication lines 30 are typically telephones, either inside or outside the hospital. They may also include hard-wired transcription units. The input units 3 and communication lines 30 may together be called communication channels. In the preferred embodiment disclosed here there are sixteen simultaneously available communication channels. This assumes a multiplexing scan cycle (discussed below) of ten thousand times per second such that each of sixteen channels is addressed for about 6.25 microseconds. By adjustments in timing, thirty-two or more channels could become simultaneously available. Any mix of input units 3 and communication lines 30 is possible, up to the maximum number of communication channels possible, which number is itself a function of the multiplexing rate. Audio communication is bi-directionally possible in the system between the input units 3 and the audio switching matrix 31 and between the tape recorders 8 and the audio switching matrix 31. Audio communication is also unidirectionally possible along a path from the audio switching matrix 31 to the communication lines 30. Control signals pass bi-directionally between input units 3 and the computer 11 through an input interface 32 and the controller 12 and between an output interface 33 and the computer 11 through a controller 12. Control signals also pass bi-directionally between communication lines 30 and the output interface 33. Further, control signals may also pass bi-directionally between the tape recorders 8 and the computer 11 through the controller 12, between the audio switching matrix 31 and the computer 11 through the controller 12, and between teletype 1 and the computer 11.

Refer now to FIGS. 5, 6, and 7, which are assembled as indicated in FIG. 15, and which show the interconnection scheme of the computer 11, teletype unit 1, digital cassette program loading and backup unit 15, the computer interface circuitry 102, input/output interface circuitry 13, tape recorders 104, the inward and outward multiplexed audio bus. 106 and 108 respectively, and the controller 12. In the preferred embodiment the system of the present invention employs a commercially available central processing unit or computer 11, such as the Digital Equipment Corporation's Model PDP 11/05, that is capable of handling sixteen bit words and allows the direct addressing of thirty-two K (K = 1024) sixteen bit words. Such a computer should contain multiple high speed general purpose registers which can be used for a variety of functions and should also be able to perform data transfers directly between input/output devices and memory without disturbing those registers. Access to the computer 11 may be had through a commercially available teletype unit 1, such as Digital Equipment Corporation's Model LA36 impact type printer. Program loading is accomplished through a commercially available magnetic tape cassette system 15, such as Digital Equipment Corporation's Model TA11. The magnetic tape cassette system 15 is also used as a safety backup unit to the computer's memory in case that memory should for some reason fail. The computer 11 is connected with the controller 12 through a commercially available general purpose device interface 102, such as Digital Equipment Corporations's Model DR11-C. Such an interface device 102 should provide the logic and buffer registers necessary for program controlled input and output parallel transfers of sixteen bit information between the computer 11 and the controller 12. It should also include status and control registers that can be controlled by either the program or the controller 12 and that can be used under program control to enable interrupt logic and command and status functions for the controller 12. The computer interface 102 can also gain control of the controller's bus and perform program interrupts to specific vector addresses. Power for the system is available from a line supply 110 to a system power input control 112 and system DC power supplies 114. The computer interface 102 is interconnected with the controller 12 which is more particularly disclosed in block diagram form in FIGS. 5, 6, and 7. The major tasks of the computer are to:

1. Assemble and correlate multiple access codes for each potential report from teletype input and store in its "requisition file"
   a. convert alphabetical data (e.g. patient name) to dial code equivalent form—i.e. numbers entered by telephone dial during remote access.
2. Assemble access codes from incoming dialled digits generated by local or remote terminals, check for errors, control characters.
3. Search requisition file for access code dialled by radiologist requesting tape for dictation.
4. Assign blank (pre-erased) tape for dictation, and transfer relevant data from requisition file to the location in the report file which corresponds with the tape assigned.
5. Clear used entries from requisition file.
6. Keep track of elapsed time since requisition was entered-used oldest data first if more than one exists for given access code.
7. Keep track of elapsed time since each report was dictated to equalize residence time in system of all reports and to allow playback of multiple reports, accessed by a given code, in the proper sequence (i.e. newest first for physician, oldest first for typist).
8. Search the report file for reports accessible by access codes entered for listening purposes.
9. Select tapes for erasure on the basis of:
   a. need for storage space for new reports.
   b. reports must be typed before erasure.
   c. oldest typed reports erased first.
   d. other criteria connected with sharing of record/erase circuitry between all records on drawer of 8.
10. Keep track of and reports via teletype on request: data on unused requisition entries, reports overdue for typing, etc.

The major functions of the controller 12 are simultaneously to generate continuous multiplex scanning of the system in order to effect transfer of audio information (voice or tones) between tape recorders and communication channels, to detect significant status or interrupt conditions on the communication channels or tape recorders being used to forward commands received from the computer 11 to other parts of the system and to return responses to the computer 11.

The basic timing for the entire controller 12 is established by the pulse output from a sixteen phase clock generator 116 and the strobes produced by a timing duration generator 118, which is a series of set/reset latches each of which is set by one of the 16 clock phases and subsequently reset by a later one, thus producing pulses whose duration is from the "set" to the "reset" pulse. For reasons of simplicity, the interconnections of the timing devices with various subassemblies of the controller are not illustrated, but they are to be assumed. The major state generator 115, which receives commands directly from the computer 11, enables many of the controller's operations. It can establish eight major states in the controllers, as follows:

MS 0: resynchronization from major state seven to major state one

MS 1: scan all sixteen communication channels for interrupt signals (normal idle state); when one is found, go to MS2

MS 2: store highest priority interrupt found in interrupt word latch 134; signal computer 11 that controller 12 is busy; after testing channel 16 go to MS3.

MS 3: highest priority interrupt is now stored; enable address comparator 137, to find the channel whose interrupt is being processed; then go to state 6.

MS 4: begin to process computer command by waiting for the appropriate time slot as detected by one of the address comparators 174, 178 according to the address mode specified by the computer via 166. When the correct equality has been detected on 182 or 184, go on to MS5.

MS 5: enable computer command decoder 186; enable requested data portion of word selector 160; carry out computer command. If input data is required, hold it in the bus latch 164, and go on to MS7; if not, drop to MS3, 2 or 1 (through MS0).

MS 6: enable interrupt data portion of word selector 160; enable mask bit deletion logic 150; select and store relevant data in interrupt data latch 146, go on to MS7.

MS 7: signal computer 11 that input data is ready 145; when data has been taken by the computer 11, drop to MS4, 3, 2, or 1 (through MS0).

The controller 12 detects significant status or interrupt conditions by continually establishing an interrupt enable mask in the mask memory 122. The clock generator 116 drives the channel address counter 120 which in major states one and two continuously scans the systems communications channels at a rate of ten thousand times per second searching for relevant interrupt conditions in each of the sixteen (in this embodiment) possible communication channels. Thus, the individual channel address is on the average 6.25 microseconds. The scanning rate can of course be adjusted to accommodate more than sixteen communication channels simultaneously in the same system. The channel address counter 120 is a four bit digital synchronous counter driven by a square wave derived from a clock oscillator whose output is decoded into sixteen separate clock phase line.

The system is programmed to detect any of eight possible interrupt conditions; none, any number, or all of such programmed interrupt conditions could be detected at once. Those that are detected in the interrupt condition detection logic 124 are gated in the interrupt enable mask gates 126 by relevant bits from the mask memory 122, which mask memory 122 contains one or more conditions the computer 11 has requested an interrupt for on the relevant individual channels. Those bits that meet the program's masking conditions are gated through the interrupt enable mask gates 126 to an eight line priority encoder 128, which selects the highest priority active input and produces it encoded in binary as an input to the priority level comparator 130, which is itself enabled in major states one and two 132 and which compares the newly discovered interrupt condition with the highest priority interrupt condition previously seen on that scan cycle and held in the interrupt word type latch 134. The higher priority interrupt condition is stored in the interrupt word type latch 134 and its address is stored in the interrupt channel address latch 136. Simultaneously, the channel type latch 138 stores a three bit portion of a status word it receives from the input/output unit 13 along the receive data path 140. The controller 12 automatically flows into major state 3 when it reaches the end of a scan cycle during which it has found an interrupt conditions, i.e. if it has entered major state 2 during a scan, it enters major state 3 at the end of that scan. Major state 3 enables an address comparator 137 which searches for a match between the channel address generated by the channel address counter 120 and derived from the channel address bus 142, on the one hand, and the channel address stored in the interrupt channel address latch 136 on the other. In major state three, during this search, the computer 11 is notified on line 144 that the controller is busy, i.e. that the computer 11 is about to receive information lest it send out a new command before that information is reported to it. When equality between the channel address generated in the channel address counter 120 and the channel address stored in the interrupt channel address latch 136 is found, the controller 12 is programmed to move automatically into major state six. In major state six, the interrupt data latch 146 stores the five bits defining either the channel status or tape status data information, whichever has been selected in the interrupt data selector 148. Major state six also enables the mask bit deletion logic 150, which deletes from the mask controlling the channel on which the interrupt appears the bit that originally enabled the interrupt, so as to eliminate the continuous searching for a bit that has already been found on a particular scan cycle and consequently multiple successive interrupts for the same condition. The original mask for the interrupting channel, now minus the interrupt causing bit due to the action of the mask deletion logic 150, is fed onto the internal data bus 152, whence it is removed and gated through the bus latches 154 when they are enabled by the bus latch control 156, itself also enabled in major state six, and stored during clock phase 13 in the mask memory 122. The memory read/write control 158 pulses the mask memory 122 to produce its stored contents for the addressed channel during clock phases 3 through 13 inclusive as an output onto the internal data bus 152 whence it gates information produced as an input to the interrupt enable mask gates 126. Major state six endures only for the period during which the channel on which the interrupt was found is addressed during a scan cycle. At the end of that period, the controller 12 steps automatically to major state seven. In major state seven, the information found in major states two and six is passed to the computer interface 102, twelve bits of it through a word selector switch 160 along path 161, and four bits along path 162 from the interrupt channel address latch 136. The word selector switch 160 is controlled by an R-S latch 164 whose output indicates whether major state seven was reached from major state six, as is here the case, or from major state five, as would occur if data had been directly requested by the computer 11. Two twelve bit data streams are presented to the word selector 160: interrupt data 160' and requested data 160" from the bus latches 154. In the present case, interrupt data 160' is passed through the word selector 160, and the requested data 160" is ignored. Major state seven persists until the computer 11 has received the above mentioned sixteen bits of information as an input and signifies that it has done so by sending a pulse to the major state generator 115 on the input received line 172, which pulse returns the major state generator 115 to major state one, two, or three, wherever it had been before it moved to major state six.

In addition to searching for interrupt conditions, the controller 12 also forwards commands received from the computer 11 to other parts of the system and returns responses to the computer 11. The computer 11 can command the controller 12 to carry out a specific action by first causing the computer interface 102 to store and forward to the major state generator 115 two control bits which partially specify the command, namely, the address mode 166 and data request 168. The computer 11 then completes the command specification by sending a sixteen bit data word through the computer interface 102 onto output lines 176 and 188, whereupon the computer interface 102 generates a pulse on the new output line 170. When such a pulse is received as an input into the major state generator 115, the major state generator 115 moves to major state four if it is currently in major states zero, one, two, or three. If the major state generator is in major state four, five, six or seven, the computer 11 will have had sufficient time to recognize, by testing the controller busy line 144 prior to issuing a pending command, that the controller is busy; therefore no such commands will be generated until the operations of those states have been completed. In major state four the controller seeks one of two conditions, depending upon whether the address mode signal 166 is in the channel address state or the tape recorder address state. If the address mode signal 166 is in the channel address state, then a channel address comparator 174 searches for equality between information in the relevant computer output bits 176 and information in the channel address counter 120. If the address mode signal is in the tape recorder address state, then a second address comparator 178 searches for equality between information in the channel address counter 120 and information in the precessing address counter 180, a four bit counter that is driven by the channel address counter 120 and that advances one step each time the channel address counter 120 overflows from fifteen back to zero in its sixteen channel scan. When equality is found by the relevant address comparator, a pulse is sent along path 182 or 184 to the major state generator 115, which when pulsed moves to major state five. Major state five in turn enables the computer command decoder 186 along interconnection 188.

When computer 11 does issue commands, it expects a response either by way of the execution of a command, as, for example, when it commands the writing of a new data word in the mask memory 122 or the connection memory 192, or that a particular tape recording be erased, or that a specific indicator or control signal be sent to a particular communications channel, or it expects a response by way of a data input, as, for example, when it requests a report of the status of a particular tape recorder or a read of the contents of the mask memory 122 or connection memory 192 for a particular channel period. When the issued command does not require a data input, the command is executed in major state five, which persists for one address period. At the end of the scan cycle, major state generator 115 returns to the state, either zero, one, two, or three, it was in before it moved to major state five. When the issued command does require input data, the information is acquired in major state five from the internal data bus 152 and stored in the bus latches 154 which are under the control of the bus latch controller 156. Information removed from the internal data bus 152 and stored in the bus latches 154 is normally of three kinds: during clock phases 1-3, data from the connection memory 192 which is enabled by the memory read/write control 158 appears on the bus 152; during clock phases 3-14, data from the mask memory 122 which is enabled by the memory read/write control 158 appears on the bus 152;

and during clock phase 14 to zero, tape status information derived from the tape status path 201 and gated through the bus gates 202, which are enabled by the computer command detector 186, appears on the bus 152. At the end of the selected address period major state generator 115 moves to major state seven and the bus latch controller 156 strobes the bus latches 154 whose data is forwarded to the word selector 160 along path 159 and switches into the computer interface 102 along path 161. Major state seven persists till computer 11 reads the data and signifies it has done so by a pulse on the input received line 172 which returns the major state generator 115 to whichever of the states zero, one, two, or three it was in before it moved to major states four and five.

A major purpose of the circuitry so far described is to maintain an audio multiplexed connection between a particular tape recorder and a particular communication channel while at the same time providing for control of the tape recorder's motions and functions, such as rewind, stop, erase, and record, through signals generated at the terminals of individual communications, channels. To accomplish this aim, once a connection is established and while it endures between a particular channel and a particular tape recorder, the relevant tape recorder address and channel address information is transferred to the two latches 198, 200, for any given extant tape-channel connection. Address information derived from the channel address bus 142 is strobed into the channel address latch 198 during clock phase 2. Address information derived from the connection memory 192 via the internal data bus 152 is strobed into the tape address latch 200, also on clock phase 2. Two clock periods after appropriate information has been stored in the channel address latch 198 and the tape address latch 200, the information in the tape address latch 200 is supplied along path 204 through buffers to all tape recorders 104, one of which will recognize it is being addressed. Thirty-two of the 1024 possible addresses are reserved as orders for particular tones. They are gated into a tone address decoder 204 which is also enabled by either end of tape or beginning of tape signals 208, 209 from the tape status memory 210 which provide audible tape position indication by overriding the normal tape-to-terminal multiplexed audio path, and by the ring, busy, and error tone on/off cycle timer 212 which periodically interrupts transmission of these tone signals to simulate telephone ring-back, busy signal and other intermittent tone signals. A tone generator comprising a number of audio tone oscillators 214 and audio mixers 216, continually generates various tones. Those tones are gated by strobes from the tone address decoder 204 into tone generator multiplex switches 218, which pass on samples of the relevant tone signals to either the inward multiplexed audio bus 106 or the outward multiplexed audio bus 108, as is appropriate.

The information in the channel address latch 198 and the tape address latch 200 enables the controller 12 to remember particular tape recorder-channel interconnections during a given multiplexing period. The actual audio and control interconnections are generated by the multiplexer and the tape motion control logic 220, which gates audio multiplexed control signals and appropriate motion control strobes to the input/output units 13 and the tape recorders 104 as required by the signals received by it as input from the motion command memory 232 and the tape status memory 210. Information from the input/output units 13, for example, whether a telephonic or hard-wired connection is called for, flows along data bus 196 through a two-way channel data bus driver/receiver 222 and out along the received data path 140 where it is received as an input to the channel status memory 226. The channel status memory 226 determines whether the information calls for telephonic or hard-wired connection and whether a new control word is ready so that, on the next successive scan of that particular channel, data instead of the normally sought status information will be requested and fed to the motion command decoder latch 224 which examines it to determine if it is a valid motion control signal and if it is, it is latched.

Enabled by the channel status memory 226, the motion command decoder latch 224 forwards its data to stage one of a motion command memory 228 where it is compared with what was previously in that memory by command comparator 230. If the data is the same as previously stored in stage one of the motion command memory 228, that data is gated into the second stage of the motion command memory 232. Whether or not a match is obtained, the new data is entered in the first stage of the motion command memory 228 for subsequent comparison with the next incoming motion command data from the same channel. Two successive identical commands are required before action is taken to eliminate false codes from switching transients or transmission noise. The two bits of information encoded in the second stage of the motion command memory 232 contain the four possible tape recorder motion conditions, viz. record, play, stop, and fast rewind.

In parallel fashion, information from the tape recorders 104, particularly concerning whether the recorder is at the beginning of a tape (BOT) or the end of a tape (EOT), flows along the tape status path 201 and is stored in the tape status memory 210. The end of tape condition, if it exists, is supplied to the multiplexer and tape motion control logic 220. These two status states 208, 209 are also fed to the tone decoder 204 which generates distinctive signals heard by a listener at the end of tape (when a message is completed) and at the beginning of tape (on rewind). The information in the second state of the motion command memory 232 together with the stored value of the end of tape condition 209 in the tape status memory 210, gated together with the recording enable bit derived from the connection memory 192 and the continuous play bit 242 derived from the mask memory 222, and clocked by a timing strobe from strobe generator 118, determine the output signals produced by the multiplexer and tape motion control logic 220, which outputs are forwarded to the tape recorders 104 along path 248 and into the input/output units 13 along paths 244 and 246.

The possible control signals to the tape recorders 104 are: no pulse, a stop/status pulse 238, a play pulse 236, or a record pulse 234. When no pulse is forwarded the tape recorder mechanism automatically rapidly rewinds the tape until the beginning of tape is reached, when the mechanism stops due to the detection by a photo source/sensor pair in the tape mechanism of a transparent section, i.e. the leader, of the tape. When a stop/status strobe 238 is forwarded, the tape recorders forward motion solenoid is turned on and a status report on the tape recorder's condition is caused to be returned to the controller. When only the stop/status strobe 238 is forwarded, the tape is stopped regardless of its position. When a play strobe 236 is forwarded, the tape recorder's drive motor is caused to run forward and an eight-way multiplexer located at the rear of the drawer holding the addressed tape recorder, which multiplexer is connected to the output of the playback amplifier and through a low pass filter from each of that drawer's eight tape recorders, is commanded to send an audio sample from the addressed tape recorder onto the outward multiplexed audio bus 108. A forwarded record strobe 234 causes a four bit latch on the drawer holding the addressed tape recorder to store the number of the addressed tape recorder (which number has been assigned more or less at random by the computer 11 after the dictating radiologist has placed his dictating unit in an off-hook condition and entered the proper identification code and dictate function command). A forwarded record pulse 234 also causes decoding of that latch and operation of the relay on the addressed tape recorder, which relay can connect the tape recorder's record head winding to the output of a recording amplifier and bias oscillator and provide the current necessary to erase and record. In addition, a forwarded record strobe 234 causes the recording amplifier on the drawer holding the addressed tape to sample the inward multiplexed audio bus 106 when that strobe is active and to hold that sample when the strobe is inactive.

The possible control signals to the input/output units 13 are in strobe 244 and out strobe 246. The in strobe pulse 244 is isochronous with the play strobe pulse 236 and sends a sample of incoming audio information through the inward multiplexed audio bus 106 to the recording amplifiers, only one of which is enabled to receive it. The out strobe pulse 246 is isochronous with the record strobe pulse 234 and causes the sample and hold circuit of the addressed channel to sample when active and hold when inactive the contents of the outward multiplexed audio bus 108. In this way an audio multiplexed connection is maintained between a particular tape recording and a particular communications channel at the same time control over the tape recorder's motions and the functions is provided from the terminals of the individual communications channels. Because of the multiplexing techniques used in the present invention, many individuals in different locations may have simultaneous access to the system's storage means either to enter new information or to have information in storage communicated to them. Further, such information is readily and conveniently available to potential users immediately after it has been stored.

FIGS. 8 and 8A are schematic diagrams of the major state generator of the controller of FIGS. 5, 6, and 7, showing more particularly its integrated circuit components and gating scheme as well as inputs and outputs coded to match similar numbers in FIGS. 5, 6, 7, where numbers in FIGS. 8 and 8A refer to similar unprimed references in FIGS. 5, 6, and 7.

FIGS. 9 and 9A are schematic diagrams of the multiplexer and motion control logic of FIGS. 5, 6, and 7, showing more particularly its integrated circuit components and gating scheme as well as its inputs and outputs coded to match similar information in FIGS. 5, 6, and 7, where primed numbers in FIGS. 9 and 9A refer to similar unprimed numbers in FIGS. 5, 6, and 7. Also shown in more particular detail are blocks 220, 224, 228, 230 and 232.

The system of the present invention in its preferred embodiment allows of four different types of access. There may be access through an internal telephone access port, through an external telephone access port, through a hard-wired transcription unit, or through a dictation unit. The circuitry to effect each of these modes of access is modular, there being two modules, one audio and one digital, for each mode. In addition, all of the control signal transfers between the controller and the modular circuitry pass through interface circuits, themselves on modules. All of these access terminal modules and interface modules are illustrated in their cabinet position in FIG. 2, Reference 13.

Refer now to FIG. 10, which is the block diagram for the internal telephone access port. Typically, an in-hospital referring physician seeking access to a stored radiological report will have his telephone call routed through the hospital's PBX to a Bell System DCK unit 300, which unit provides an outgoing audio transmission pair 328, an ingoing seize path 301, an outgoing answer path 303, and an ingoing dial pulse path 305. When the DCK unit 300 is seized 301, a pulse is generated in pulse generator 307 in response and a set of status transfer AND gates 302 is notified by a change in level at their inputs 309. On a status strobe 304 for the relevant channel 306, the computer is notified through the controller of the off-hook condition and sends to the caller a dial tone in response to which the caller using the internal telephone access port starts pulse dialing the identification number of the report he wishes to reach. A pulse counter 308, which is an integrated circuit decade counter, accumulates the dial pulses and transfers the numbers they represent into a digit storage register 310, which is an edge clocked quad D flip-flop memory. This transfer also conditions a data ready line 312, which pulses the status transfer gates 302. The controller detects this data ready status strobe and sends a data strobe 314 in response which enables a set of unidirectional data transfer AND gates 316 that forward the digit in storage through the interface and ultimately to the computer. The computer stores the dialed digits, and when it detects that the access code is completed, it searches its internal files to determine which, if any, of the reports stored on the tape recorder bank are accessible by that code, e.g. the digits corresponding to the last name of a patient delimited by dialing zero after the last letter, or the referring physician's hospital identification number which contains a predetermined number of digits of which the first digit is a one. If one or more reports exist which are accessible by the code dialed, the computer selects the most recently dictated of these; it then, through the controller tests the status of the recorder on which the selected report is stored. If the selected recorder responds that it is ready and that its tape is positioned at the starting point, i.e. BOT or beginning of tape, then the computer commands the controller to store the address of the selected tape recorder in the connection memory at the location thereof which corresponds to the relevant channel. If no reports exist which are accessible by the code dialed, or if the selected recorder is not ready or is not at BOT, or if for any other reason the system cannot immediately provide the requested report, the computer commands the controller to store the address of an appropriate tone signal. In either event, the Controller 12 now addresses the audio source, either tape recorder or tone generator, whose address has been entered at the relevant location in the connection memory 192 each time the relevant channel is scanned by the channel address counter 120. The controller 12 also sends appropriate strobe signals to both the audio source and the relevant channel. In particular, the controller sends out strobe 246 to the relevant channel address 306 which causes an audio strobe 318 to enable a sample and hold circuit 320, itself a type CA3080 operational transconductance amplifier with capacitor and field effect transistor, to pull relevant multiplexed audio information off the outward audio buss 322. Such information is forwarded through a variable gain operational amplifier automatic gain control 324, which produces constant amplitude, to a 747 type operational amplifier low pass filter 326, which eliminates high frequency transients thereby smoothing the audio information. The information is then coupled to the audio out path 328 by transformer 330. This circuit also contains an end of message detector 332, which is a series of operational amplifiers with active filter detectors and limiters. The end of message detector 332, when it finds an end of message tone, forwards that condition to the status transfer gates 302 which, on a status strobe 304 for the relevant channel address 311, forward that information to the interface modules and ultimately to the computer. The control section of this circuit also contains edge clocked dual D flip-flops which serve as an error detector 334 and which will produce a call abort if too many digits are presented for storage too quickly.

Refer now to FIG. 11, which is a block diagram of the system's external telephone access port. Typically, a physician seeking access to the system's storage means through a telephone will call through a telephone central office and reach a Bell System RDY unit 340 which provides a bidirectional audio transmission pair 342, an ingoing service request line 344, an outgoing answer path 346, and an ingoing off-hook indicator path 348. The RDY unit 340, when it makes a service request 344, fires a monostable multivibrator pulse generator 350, which returns an answer 346 to the RDY unit 340. This answer generates an offhook condition signal 348 from the RDY unit 340, which signal is gated through the status transfer gates 352 on the status strobe 354 for the relevant channel 356 and placed onto the data buss from the interface modules through the controller to the computer which commands that a dial tone signal be returned to the caller. The caller then enters touchtone signals on the audio transmission pair 342 that are accepted on a 2/4 wire hybrid balanced bridge circuit 358, which circuit converts a bi-directional information channel into two independent paths, namely one outgoing demultiplexed path 384 and one incoming path 360 for the recognition of TOUCHTONE signals. The incoming TOUCHTONE signals are decoded in a phase locked loop tone detector circuit comprising a low and high pass filter 362, 364, a low and a high band tone detector 366, 368, and a monitoring circuit 369 that determines whether there is one and only one tone present in each of the relevant high and low frequency bands, i.e. that determines that there are valid TOUCHTONE signals. The tone detector circuitry separates the TOUCHTONE signals into their individual high and low frequency bands, i.e. that determines that there are valid TOUCHTONE signals. The tone detector circuitry separates the TOUCHTONE signals into their individual high and low frequency components and stores them in storage flip-flop registers 370, 372. Storage of a decoded tone fair generates a data ready condition 374 that is forwarded through the status strobe 354 at the relevant channel address 356 and through the interface modules to the system's data buss and ultimately to the controller which, when informed that there is data ready, generates a data strobe 376 to the data transfer gates 378 on the relevant channel address 356. When thus pulsed, the data transfer gates 378 forward the decoded numbers through the controller to the computer, as discussed above. When the audio strobe 380 is received at the relevant channel address 382, the outward multiplexed audio information 385 is forwarded through sample and hold circuitry 386, an automatic gain control 388, and a low pass filter 390, all like the similar components described above, to the 2/4 wire hybrid 358. It is then coupled by transformer 392 to the caller. This circuit also provides an end of message tone detector, which condition, when received, is transferred to the status transfer gates 352, and status strobed 354 at the relevant cchannel address 356 to the computer.

Refer now to FIG. 12 which illustrates in block diagram form the circuitry necessary to interconnect the transcription unit 400 with the reset of the system. The transcription unit contains an audio reception pair 402, two ingoing data transmission lines 404, and two outgoing data reception lines 406. Since there is a digital interface between these transcribing stations and the rest of the system, there must be parallel to serial information conversion. A universal asynchronous receiver transmitter 408 performs this function. When an off-hook condition is detected 409 and reported through the bi-directional status transfer gates 410, the computer responds by commanding the controller to forward through the transmitter section of the universal asynchronous receiver transmitter 408 an eight bit code which is received by the receiver section of a similar device in the transcription terminal which in turn and causes the dial indicator lamp to light. This notifies the transcribing secretary to dial in an appropriate identification code through the data in path 404. The reception also generates a data ready signal 412 as an output of the universal asynchronous receiver transmitter 408 that is gated through the status transfer gates 410 on a status strobe 412 for the appropriate channel 414, ultimately to the computer which sends in return signals to the typist's transcribing unit through the bi-directional data transfer gates 416, which, enabled on a data strobe 418, forward parallel information to the universal asynchronous receiver transmitter 408, where it is converted to serial information and forwarded to the transcription unit 400, for example, as an illuminated alphanumeric display. The control circuitry in the dictation units is identical to the control circuitry in the transcription units 400. The audio circuitry in the transcription unit 400 is identical to the audio circuitry described above in a discussion of the internal telephone access port. When the secretary has entered a complete access code, the computer searches its internal files for reports accessible by the code entered. The procedure is identical to that described above in relation to the telephone access ports, except that all reports accessible by the code entered which have already been transcribed are ignored in this search, and also that the secretary receives the oldest relevant report rather than the newest.

Upon completing the typing of a report, the secretary dials a control function, e.g. *, to inform the computer that, indeed, the report has been typed; moreover, the end of message detection signal must previously have been received by the computer for the relevant report to be logged as transcribed.

Once a report has been logged by the computer as transcribed, the tape recorder containing that report becomes eligible for erasure.

Refer now to FIG. 13 which shows in block diagram form the circuitry for a dictation unit 420. The dictation unit 420 has an outgoing audio transmission pair 421 and an incoming audio reception pair 422, both of which pairs are interconnected to its audio module. It also has an outgoing data transmission pair and an incoming data reception pair, all of wich are interconnected with its control module. The dictating physician's ingoing audio information is coupled by transformer 424 to automatic gain control 426 and low pass filter 428 which respectively produce constant amplitude and remove high frequency transients. This information is then presented as an input to strobe gate 430 which transfers the audio information in multiplexed form onto the inward multiplexed audio bus 432 when it is strobed 434 at the relevant channel address 436. This circuitry contains the same components for the reception of outward multiplexed audio information 437 and the transcription unit discussed above. However, it contains in addition a no-talk detector 438 which in effect monitors the audio recording current in the record head of the tape recorder onto which the radiologist is dictating. If no audio signal is detected after above five seconds, the no-talk detector 438 turns positive and fires a tone gate 440 which connects the output of the no-talk tone oscillator 456 to the outgoing audio path with the result that audio tone is returned to the dictating physician, i.e. a warning is returned that his voice is not being recorded properly. In addition, the dictating unit's audio circuitry contains an audio gate 442, which is enabled by the computer through the interface, that allows the dictating physician to listen as well as to dictate with his unit 420, while not allowing both at once. The control functions of the dictating unit 420 are identical to those of the transcription unit as discussed above.

Refer now to FIG. 14 which illustrates the circuitry contained in the interface module. The interface module sections of the input/output circuitry contain buffer circuitry 446, 448, which buffers the inward and outward multiplexed signals 450, 452, respectively. They also contain a two out of seven to binary code converter 454, so that touchtone information from the dictation units, transcription units, and the external telephone access ports can be converted to binary information and gated onto the controller bus. The interface modules also contain the oscillator 456 which generates the no-talk tone which is interconnected with the dictation units.

Other embodiments will occur to those skilled in the art and are within the following claims:

What is claimed is:

1. A simultaneous multiple access information storage and retrieval system comprising in combination:
    magnetic recording and playback means including tape transport means and means for storing audio information;
    at least one input device for providing audio information to said means for storing audio information;
    at least one output device for selectively reproducing said stored audio information in said magnetic recording and playback means;
    a controller including means for multiplexing the interchange of audio signals between each said input device and said recording and playback means, wherein said controller further includes means for simultaneously controlling the motions of said tape transport means and record and erase functions of said magnetic recording and playback means.

2. The system of claim 1 wherein each said audio input device is a dictating station.

3. The system of claim 2 wherein each said audio input device communicates with said magnetic recording and playback means through bi-directional motion control signals.

4. The system of claim 1 wherein each said audio input device is a telephone.

5. The system of claim 1 wherein each said audio output device is a telephone.

6. The system of claim 5 wherein each said telephone is connected to a private branch exchange.

7. The system of claim 5 wherein each said telephone is connected to a telephone system central office.

8. The system of claim 1 wherein each said audio output device is a transcribing unit.

9. The system of claim 1 wherein said magnetic recording and playback means comprise a plurality of short message period magnetic tape recorders.

10. The system of claim 1 wherein said controller cooperates with a central processing unit through an interface device, which said interface device cooperates with said central processing unit and said controller by providing two-way transfers of information between said central processing unit and said controller.

11. The system of claim 1 wherein said controller is enabled in its operations by a major state generator that detects pre-arranged interrupt conditions and acts on them according to pre-arranged priorities to store information in and to recall information from said means for storing audio information.

12. A simultaneous multiple access information storage and retrieval system comprising in combination:
    magnetic recording and playback means including means for storing audio information;
    a plurality of input devices capable of simultaneously providing audio information to said means for storing audio information;
    a plurality of audio output devices capable of simultaneously and selectively reproducing said stored audio information in said magnetic recording and playback means;
    electronic components including means for simultaneously maintaining the interchange of audio signals between said input devices and one location in said recording and playback means and between said output devices and another location in said recording and playback means.

* * * * *